(12) United States Patent
Mihota

(10) Patent No.: US 7,574,004 B2
(45) Date of Patent: Aug. 11, 2009

(54) IMAGE DISPLAY METHOD AND IMAGE DISPLAY PROCESSOR

(75) Inventor: Norihito Mihota, Kanagawa (JP)

(73) Assignee: Sony Corporation (JP)

( * ) Notice: Subject to any disclaimer, the term of this patent is extended or adjusted under 35 U.S.C. 154(b) by 334 days.

(21) Appl. No.: 10/507,716

(22) PCT Filed: Feb. 3, 2004

(86) PCT No.: PCT/JP2004/001075

§ 371 (c)(1),
(2), (4) Date: Sep. 14, 2004

(87) PCT Pub. No.: WO2004/071081

PCT Pub. Date: Aug. 19, 2004

(65) Prior Publication Data

US 2005/0129230 A1    Jun. 16, 2005

(30) Foreign Application Priority Data

Feb. 5, 2003    (JP) .............. 2003-028170

(51) Int. Cl.
H04N 7/167 (2006.01)
(52) U.S. Cl. ............ 380/203; 380/201; 380/202; 380/204; 382/100; 382/232
(58) Field of Classification Search ............ 380/203
See application file for complete search history.

(56) References Cited

U.S. PATENT DOCUMENTS

| 5,680,454 | A | 10/1997 | Mead |
| 6,253,193 | B1 * | 6/2001 | Ginter et al. .......... 705/57 |
| 6,529,600 | B1 * | 3/2003 | Epstein et al. .......... 380/252 |
| 6,809,792 | B1 * | 10/2004 | Tehranchi et al. .......... 352/85 |

FOREIGN PATENT DOCUMENTS

| JP | 2002-519724 | 7/2002 |
| JP | 2002-314938 | 10/2002 |
| JP | 2003-169273 | 6/2003 |

* cited by examiner

*Primary Examiner*—Longbit Chai
(74) *Attorney, Agent, or Firm*—Lerner, David, Littenberg, Krumholz & Mentlik, LLP

(57) ABSTRACT

A method and apparatus for directly and indirectly preventing illegal copying of works such as cinema or video images displayed on a display apparatus such as a theater screen or display unit. In particular, the method and apparatus prevents illegal copying of a displayed work wherein one seeks to use an image pickup apparatus, such as a video camera, to make a copy of the displayed work. Prevention of illegal copying is achieved by implementing one or more changeover modes to changeover a display operation condition so that a stripe pattern or the like is produced on a redisplayed image to deteriorate the quality of the redisplayed image.

9 Claims, 25 Drawing Sheets

F I G. 3 A

OPERATION
CONDITION
CONTROL
INFORMATION
(ENCRYPTED)

10100110...

F I G. 3 B

DISPLAY OPERATION CONDITION

| 1 | 0 | 1 | 0 | 0 | 1 | 1 | 0 |
|---|---|---|---|---|---|---|---|
| B | A | B | A | A | B | B | A |

N FRAMES

→ TIME

F I G. 3 C

DISPLAY OPERATION CONDITION

| 1 | 0 | 1 | 0 | 0 | 1 | 1 | 0 |
|---|---|---|---|---|---|---|---|
| B | A | B | A | A | B | B | A |

N FRAMES

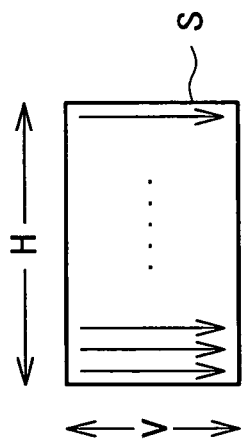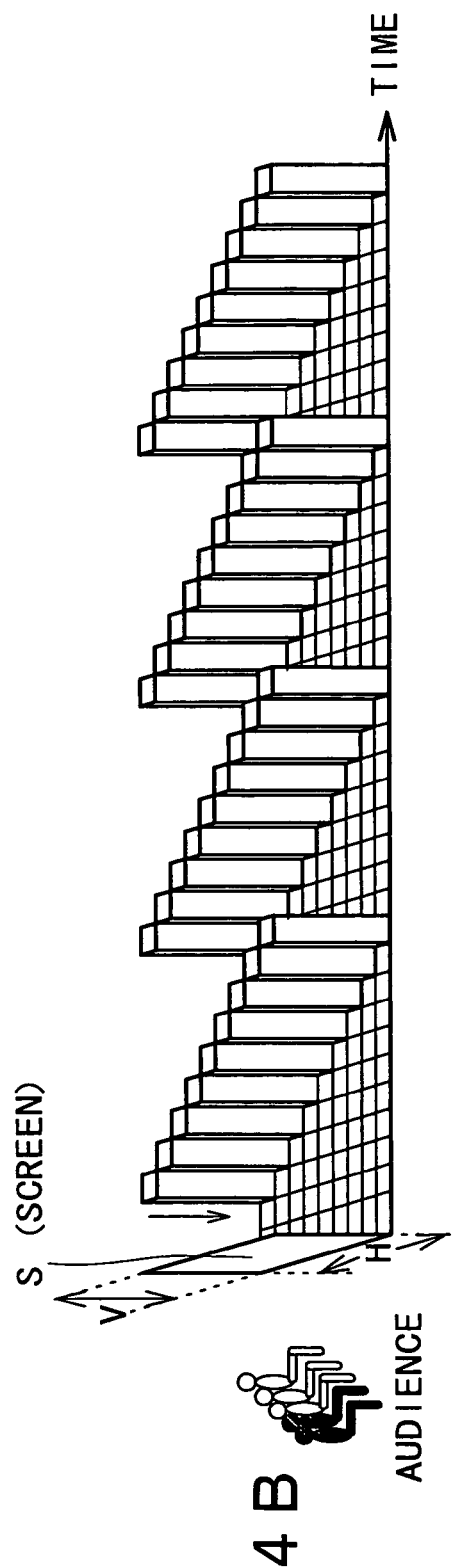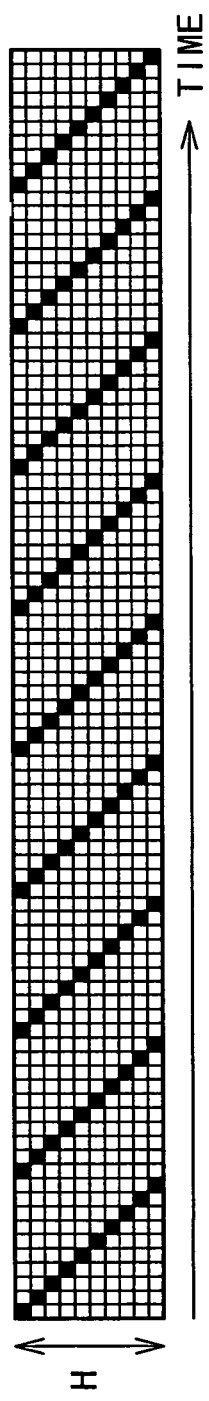
F I G. 4 A
F I G. 4 B
F I G. 4 C

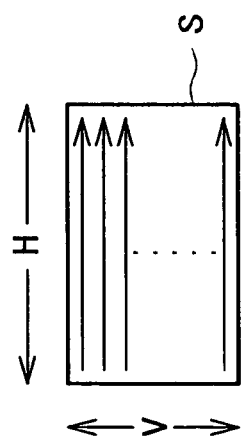
F I G. 5 A
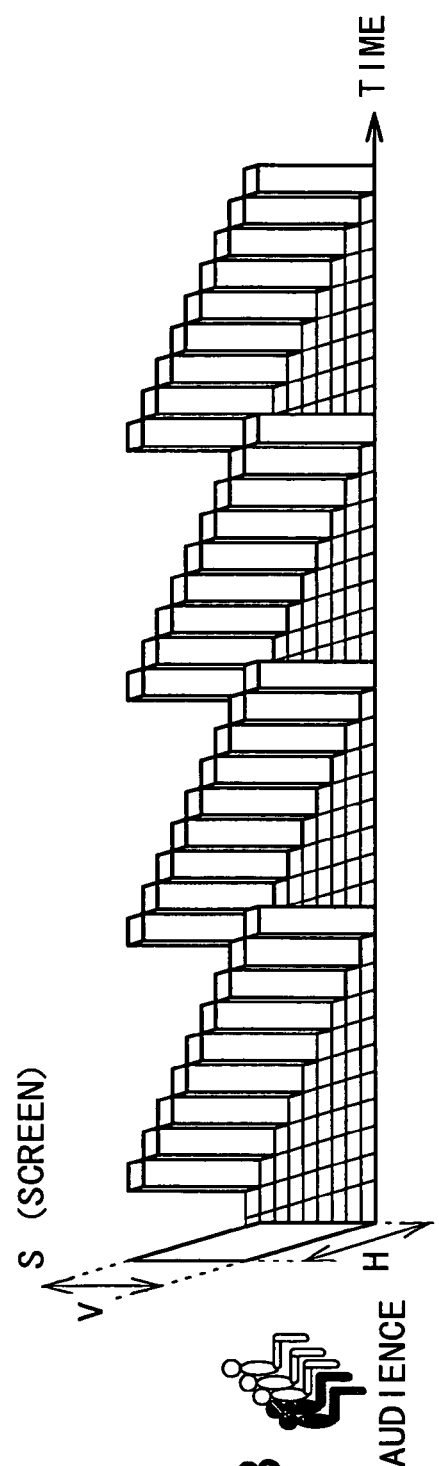
F I G. 5 B
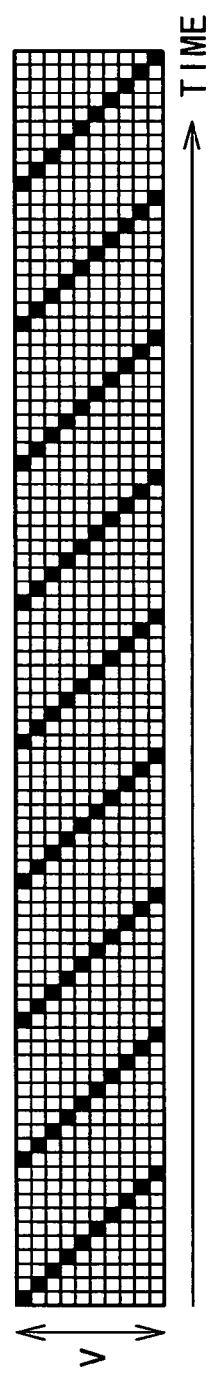
F I G. 5 C

■ : ORDINARY LUMINANCE   × : DARK   ○ : BRIGHT

F I G. 9
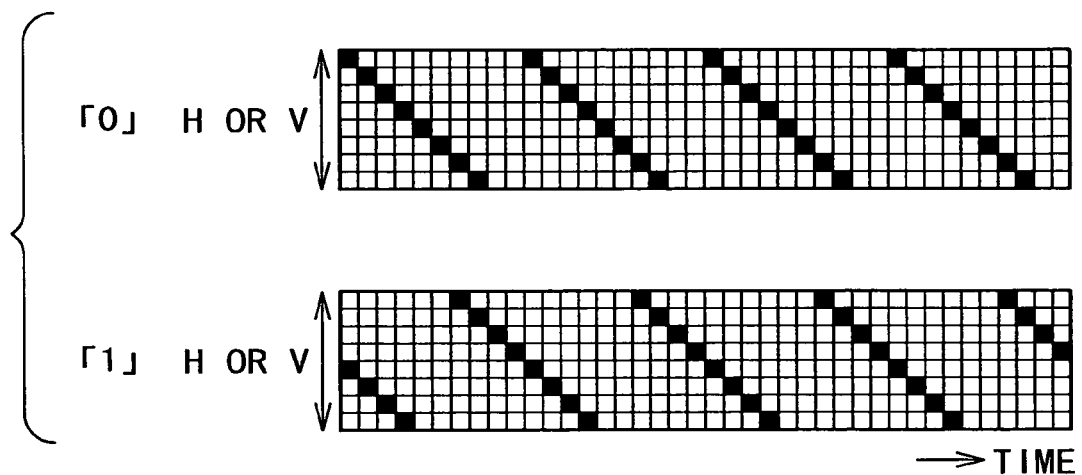
F I G. 10
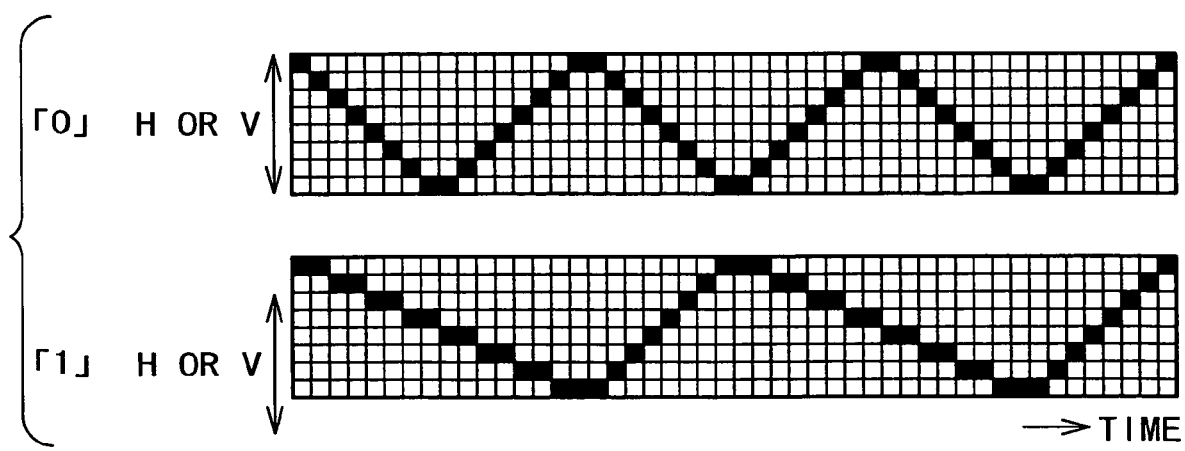

F I G. 1 2 A
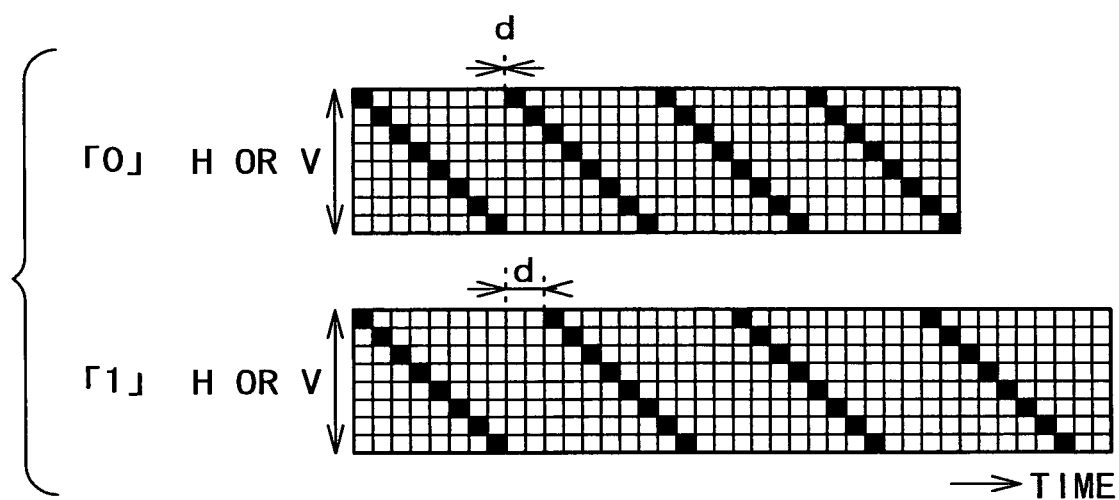
F I G. 1 2 B
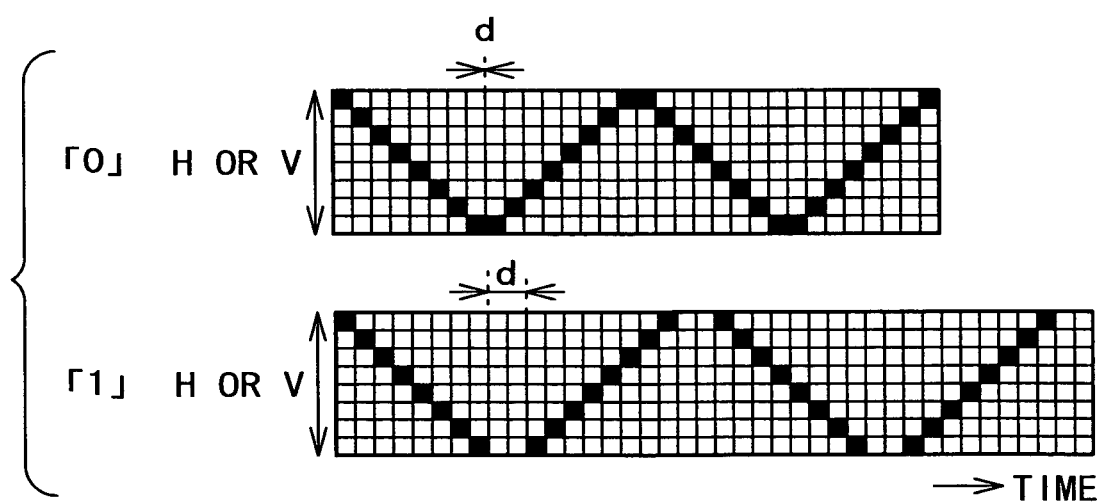

■:ORDINARY LUMINANCE   ✕:DARK   ○:BRIGHT

→ TIME

→ TIME

「0」

「1」

「0」

「1」

「0」

「1」

「0」

「1」

IMAGE DISPLAY METHOD AND IMAGE DISPLAY PROCESSOR

TECHNICAL FIELD

This invention relates to an image display method and an image display processing apparatus, and more particularly to a technique for directly and indirectly preventing that a literary work such as a cinema or a video image displayed on a general display apparatus such as a theater screen or a display unit is picked up illegally by an image pickup apparatus such as a video camera and distributed.

BACKGROUND ART

As a result of improvement in recent years in display apparatus in terms of the resolution and in performance of image pickup apparatus such as a digital video camera, such piracy that a literary work such as a cinema or a video image displayed on a display apparatus such as a screen or a display unit is picked up directly as an image and distributed illegally has become a serious problem. It is forecast estimated, as such improvement in display apparatus and image pickup apparatus further proceeds in future, the situation becomes further serious.

It is to be noted that, in the present specification, an action of picking up an image on a display apparatus illegally by means of a video camera or the like is referred to as "(image) re-pickup".

In order to deal with such image re-pickup, such a technique for preventing the image re-pickup as to provide distortion only on a re-picked up image picked up by a video camera or the like without allowing a spectator who observes an image to recognize the distortion has been laid open.

For example, U.S. Pat. No. 5,680,454 discloses a technique wherein the frame rate of a display apparatus is varied with respect to time in accordance with a pseudo-random noise sequence. This makes an image pickup person to establish frame rate synchronism, and as a result, distortion is provided on a re-picked up image.

U.S. Pat. No. 6,018,374 discloses a technique wherein a message is projected using infrared rays in an overlapping relationship with an image on a screen to place the message into a re-picked up image of a CCD video camera which is sensible to infrared rays to disorder the re-picked up image.

Japanese Patent Laid-Open No. 2002-314938 discloses a technique wherein a pixel display is turned on and off (intensity modulated) at a rate at which the human being cannot recognize to display a symbol, a random pattern or characters on a re-picked up image.

Japanese Patent Laid-Open No. 2002-519724 discloses a technique wherein the frame rate, line rate or pixel rate is varied frequently in accordance with an unpredictable sequence created by a cryptographically safe algorithm or a natural source, or the frame rate is varied in accordance with the variation amount of a scene to provide distortion on a re-picked up image.

In the meantime, also a great number of techniques for placing an electronic watermark into an image have been developed. As an electronic watermark to be placed in an image, usually an "invisible watermark" which cannot be visually recognized by the audience is used. The invisible watermark can be used to embed information, for example, of the title of the image, a serial number unique to the image, the name of a producing person, the name of a distributor and so forth into an image. A person or an organization that has the copyright would claim the copyright of a re-picked up image based on the embedded information.

The prior art techniques described above except the electronic watermark are all intended to disorder a re-picked up image.

Actually, however, it is not impossible to perform image re-pickup such that the image is not disordered or no message is included.

For example, in order to cope with the technique of U.S. Pat. No. 6,018,374, only if an optical filter for removing infrared rays is placed in front of a video camera, the effect of the technique can be eliminated simply by anyone.

Also as regards the techniques disclosed in the other patent documents mentioned hereinabove, if a video camera whose shutter speed or frame rate can be adjusted optimally is used, then the distortion which may appear on a re-picked up image can be moderated although it is difficult to completely remove the distortion of the image.

From the foregoing, the method of disordering a re-picked up image to prevent distribution of an illegal re-picked up image is limited in the suppression effect.

On the other hand, as regards the techniques which use an electronic watermark, since they use an invisible watermark, that is, since they are not directed to disordering of an image, a person who observes the re-picked up image cannot visually distinguish whether the image is a re-picked up image illegally picked up or an image which is not illegal. Therefore, the effect of suppressing the distribution of a re-picked up image by disordering the image itself cannot be anticipated. The techniques suppress re-image pickup indirectly by giving a warning or enabling claiming of the right to a person who executes re-pickup of an image/distributes a re-picked up image.

However, an action of placing an electronic watermark into an image corresponds in a certain sense to disordering of an original image to degrade the picture quality. Therefore, to an author or an image producing person who attaches importance to the picture quality of an image, the action itself corresponds to modification to the literary work, and the author or image producing person may show disapproval of use of an electronic watermark. Therefore, there is a situation wherein the technique itself cannot be executed readily.

DISCLOSURE OF INVENTION

Therefore, it is an object of the present invention to directly and indirectly prevent further effectively that a literary work such as a cinema or a video image displayed on a general display apparatus such as a theater screen or a display unit is picked up illegally by an image pickup apparatus such as a video camera and distributed.

In order to attain the object described above, according to an image display method of the present invention, for an image signal inputted, changeover of a display operation condition is performed based on the value of operation condition control information having predetermined substance to display or output the image signal.

In this instance, as the changeover of the display operation condition, one or a plurality of changeover modes from among changeover of the frame rate, changeover of the scanning direction, changeover of the luminance, changeover of the scanning phase, changeover of the scanning pattern, changeover of the time position of scanning, and changeover of the scanning interval are performed.

Further, as the changeover of the display operation condition, changeover of two or more operation conditions is performed so that, although a variation of a displayed image cannot be visually recognized, degradation in image is provided on an image signal obtained by picking up the displayed image using an image pickup apparatus. The changeover of such two or more operation conditions is, for example, changeover of a first frame rate and a second frame rate.

Meanwhile, the operation condition control information includes information regarding an image itself, information regarding an image display apparatus, information regarding an image display establishment, information regarding the date and hour of image display, or information regarding image management.

The operation condition control information is encrypted operation condition control information having predetermined substance in an encrypted form.

An image display processing apparatus of the present invention includes storage means for storing operation condition control information having predetermined substance, signal processing means for performing a signal process for displaying or outputting for an image signal inputted thereto, and changeover control means for controlling the signal process of the signal processing means so that a display operation condition is changed over based on the value of the operation condition control information stored in the storage means.

The changeover control means controls the signal processing means so that, as the changeover of the display operation condition, one or a plurality of changeover modes from among changeover of the frame rate, changeover of the scanning direction, changeover of the luminance, changeover of the scanning phase, changeover of the scanning pattern, changeover of the time position of scanning, and changeover of the scanning interval are performed.

Further, the signal processing means performs the changeover of two or more operation conditions so that, although a variation of a displayed image cannot be visually recognized, degradation in image is provided on an image signal obtained by picking up the displayed image using an image pickup apparatus.

Meanwhile, the operation condition control information stored in the storage means includes information regarding an image itself, information regarding an image display apparatus, information regarding an image display establishment, information regarding the date and hour of image display, or information regarding image management.

Further, the operation condition control information stored in the storage means is encrypted operation condition control information having predetermined substance in an encrypted form.

An image display system of the present invention includes an image source, an image display processing apparatus for performing changeover of a display operation condition of an image signal from the image source based on the value of operation condition control information having predetermined substance, a display section on which an image is displayed by the image display processing apparatus, and a management section capable of detecting the operation condition control information from an image obtained by picking up the image displayed on the display section.

The operation condition control information is encrypted operation condition control information having predetermined substance in an encrypted form.

According to the present invention described above, information (operation condition control information) can be embedded on a re-picked up image without involving picture quality degradation of an original image and disorder of the re-picked up image can be created.

In particular, by displaying an image while the display operation condition such as the frame rate or the luminance is successively changed over, a stripe pattern or the like is produced on the re-picked up image thereby to degrade the picture quality of the re-picked up image. Further, by executing the changeover of the display operation condition based on the value of the operation condition control information, the operation condition control information can be added to the re-picked up image even if it is not embedded in the original image signal itself.

In other words, by successively changing over the display operation condition of the image based on the operation condition control information which is some "significant information", a stripe pattern or the like is produced on the re-picked up image thereby to degrade the picture quality of the re-picked up image. Further, by executing the changeover of the display operation condition based on the value of the operation condition control information, the operation condition control information can be added to the re-picked up image even if it is not embedded in the original image signal itself.

In short, by successively changing over the display operation condition of the image based on the operation condition control information which is some "significant information", both or disordering of the image and embedding of the information into the re-picked up image are performed.

The operation condition control information as the significant information here is information which can specify an image display processing apparatus such as, for example, an apparatus ID or a serial number, information which can specify an establishment or a place where the image is displayed, information which can specify the date and hour at which the image is displayed, information which can specify the image itself such as a serial number unique to the image or the like.

Further, the display operation condition to be changed over is such a display operation condition that cannot be visually recognized readily by the audience observing the image but provides distortion on a re-picked up image obtained by picking up the image using a video camera. Therefore, the changeover of the display operation condition does not provide a degraded image to the audience but provides a variation on the screen of the re-picked up image.

BRIEF DESCRIPTION OF DRAWINGS

FIGS. 3A, 3B and 3C are diagrammatic view illustrating operation condition switching based on operation condition control information of the embodiment;

FIGS. 4A, 4B and 4C are diagrammatic views of a vertical scanning method to which the embodiment can be applied;

FIGS. 5A, 5B and 5C are diagrammatic views of a horizontal scanning method to which the embodiment can be applied;

FIG. 9 is a diagrammatic view of phase switching of the embodiment;

FIG. 10 is a diagrammatic view of pattern switching of the embodiment;

FIGS. 12A and 12B are diagrammatic views illustrating interval switching of the embodiment;

BEST MODE FOR CARRYING OUT THE INVENTION

Figure 1:
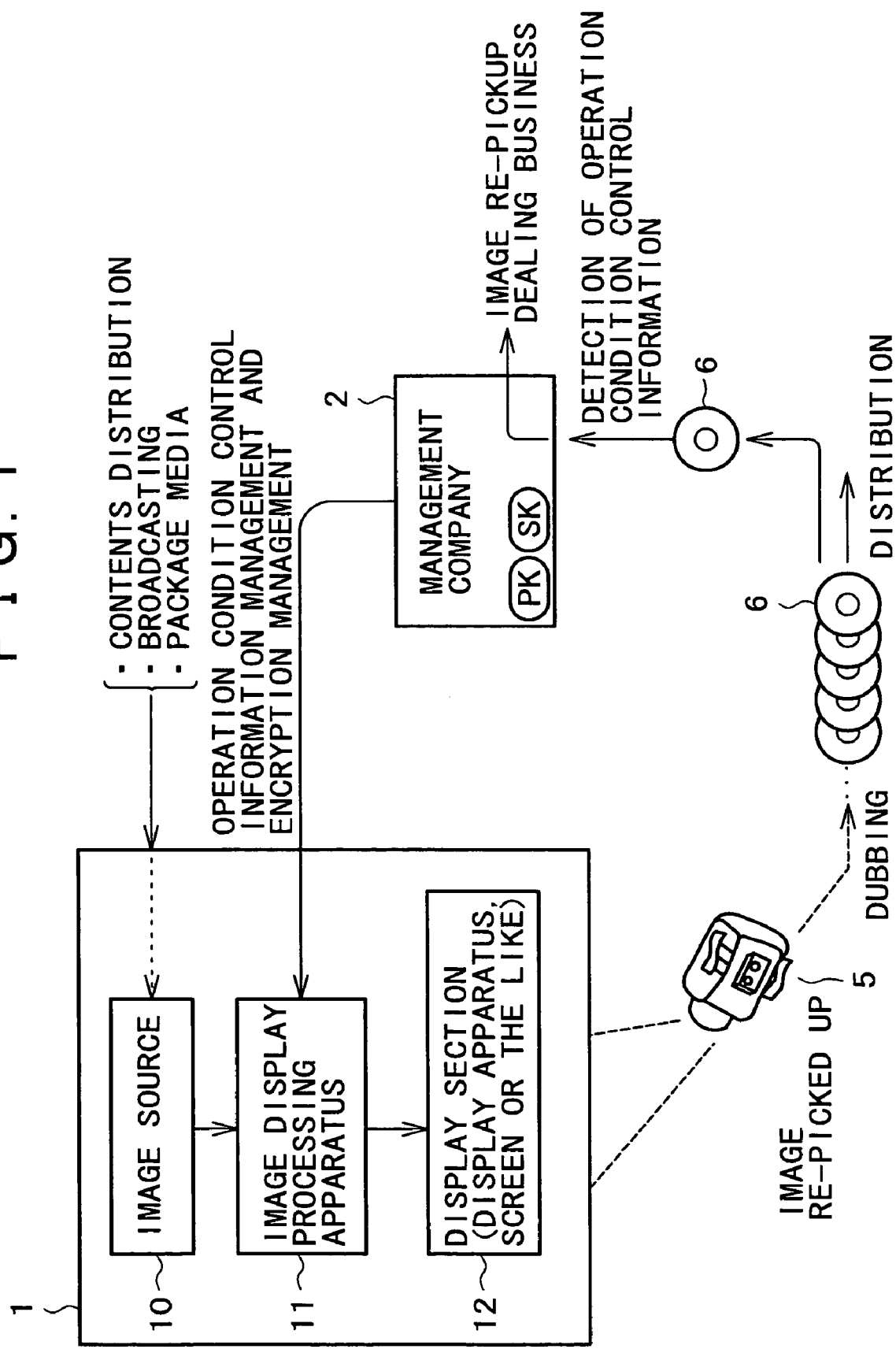
FIG. 1 is a diagrammatic view of an image display system of an embodiment of the present invention.

In the following, an embodiment of the present invention is described in the following order.
1. System Configuration
2. Image Display Processing Apparatus
3. Operation Condition Control Information
4. Modes of Display Operation Condition Changeover Based on Operation Condition control Information
5. Embedding Methods of Operation Condition Control Information
6. Detection of Operation Condition Control Information
7. Effects of the Embodiment and Modifications 1. System Configuration FIG. 1 shows an embodiment of a configuration of an image display system of the embodiment.

A screening establishment 1 is an establishment which has an opportunity to perform image display such as, for example, a movie theater, a hall, cultural facilities and personal facilities.

In the screening establishment 1, an image source 10, an image display processing apparatus 11 and a display section 12 are prepared, and display (screening) of a cinema or other image contents is performed.

The image source 10 indicates image contents to be screened. The image contents include those supplied or distributed from a cinema distributing company or the like, those broadcast by television broadcasting and those purchased in the form of a package medium such as an optical disk or a video tape. Accordingly, the image source 10 may particularly be a film, a recording medium on which distributed image contents data are recorded, a broadcasting tuner or a package medium. There is no limitation to the particular apparatus configuration or contents type of the image source.

The image display processing apparatus 11 is an apparatus which performs a required signal process for an image signal supplied thereto from an image source so that the image signal can be displayed on the display section 12. In particular, a necessary signal process is performed in accordance with the configuration of the display section 12. For example, if the display section 12 is a screen, then a projector apparatus (image projecting apparatus) corresponds to the image display processing apparatus 11. On the other hand, if the display section 12 is formed from a CRT (Braun tube), then a processing apparatus for outputting to the CRT corresponds to the image display processing apparatus 11.

In short, the image display processing apparatus 11 has an apparatus or circuit configuration for allowing an image from the image source 10 to be displayed on the display section 12, and there is no limitation to the particular configuration of the image display processing apparatus 11.

It is to be noted that, as hereinafter described, in the present embodiment, the image display processing apparatus 11 is provided with a function of switching the display operation condition based on operation condition control information.

A management company 2 is an organization which does not perform management directly regarding image display (screening) or provision of an image source or the like in the screening establishment 1 (but may naturally perform such management business) but perform management particularly of operation condition control information for use with a changeover operation in the image display processing apparatus 11 or encryption of the operation condition control information.

In particular, the management company 2 performs required working for providing operation condition control information to the image display processing apparatus 11 and working for encryption of the operation condition control information.

Further, the management company 2 performs a check of copy image products distributed on the market to detect operation condition control information and performs corresponding working.

For example, it is assumed that an illegal action of carrying a video camera 5 into a movie theater or the like which is the screening establishment 1, re-picking up an image displayed on the display section 12, dubbing the re-picked up image on a disk or the like to produce a copy product 6 and distributing the copy product 6 on the market is performed.

According to the present system, the copy product 6 ought to have some disorder in an image (such as a stripe pattern) as a result of changeover of the display cooperation condition by the image display processing apparatus 11, and besides, if the disorder is analyzed, then the operation condition control information used by the image display processing apparatus 11 can be detected. If operation condition control information is detected from the copy product 6, then the management company 2 would adopt such countermeasures for prevention of illegal image re-pickup or for compensation for infringement on the copyright based on the detected operation condition control information.

2. Image Display Processing Apparatus

Figure 2:
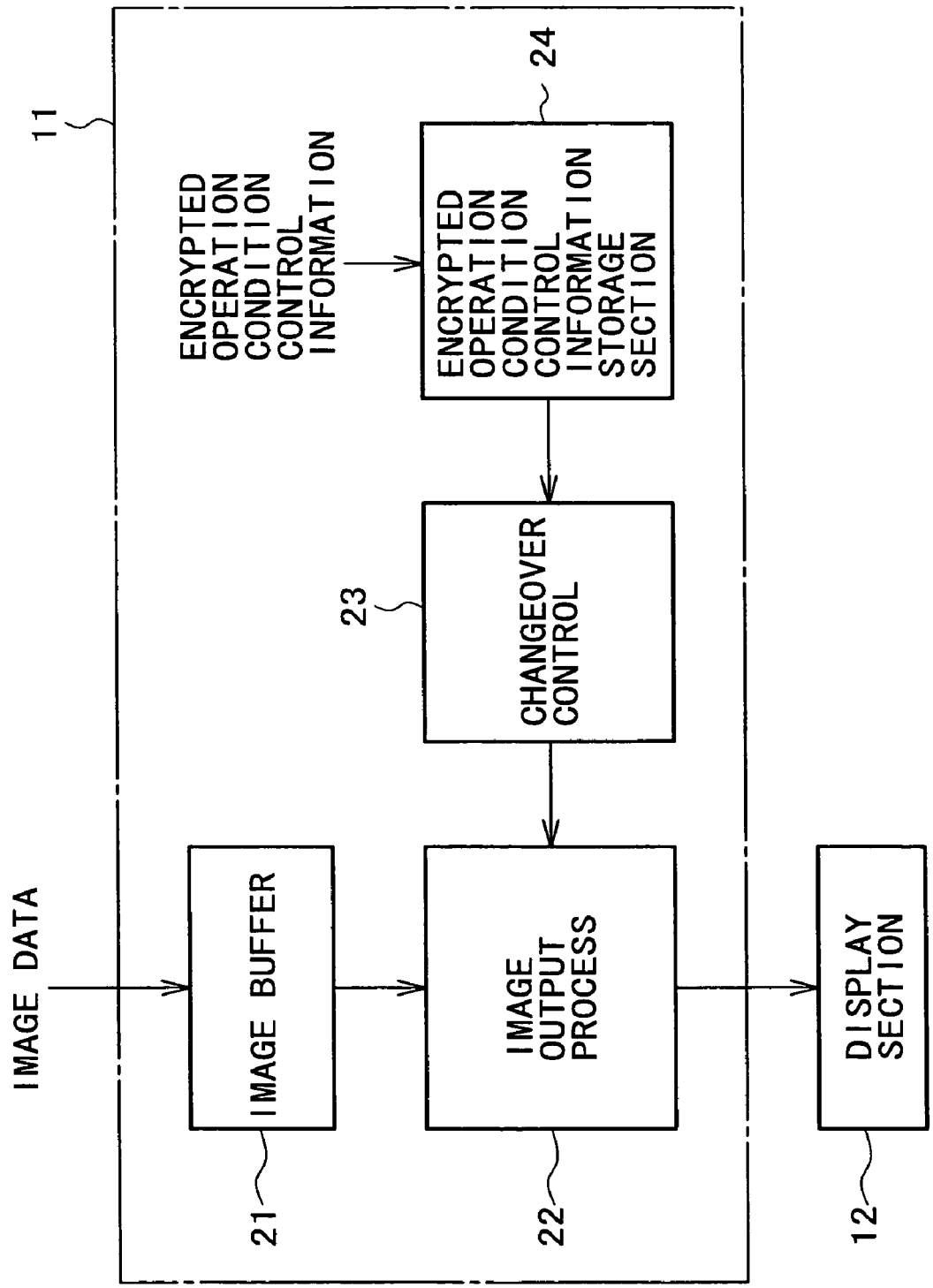
FIG. 2 is a block diagram of an image display processing apparatus of the embodiment.

FIG. 2 shows an example of a configuration of the image display processing apparatus 11.

An image buffer 21 is a buffer area for image data from the image source 10. An image output processing section 22 successively processes the image data fetched in the image buffer 21 at predetermined timings and outputs the resulting image data to the display section 12.

Particular configurations and substances of processing of the image buffer 21 and the image output processing section 22 differ depending the type of the image apparatus (type such as, for example, a projector/CRT image apparatus), and therefore, detailed description of them is omitted herein. However, necessary processes such as, for example, data decoding, D/A conversion, A/D conversion, a frame process, a luminance process a color process and a display driving process are performed depending upon the type of the apparatus.

In the present example, the image output processing section 22 performs a changeover process of the display operation condition in addition to such ordinary processes for image outputting.

For example, as changeover of the display operation condition, one or a plurality of changeover modes from among changeover of the frame rate, changeover of the scanning direction, changeover of the luminance, changeover of the scanning phase, changeover of the scanning pattern, changeover of the time position of scanning, and changeover of the scanning interval can be performed.

In regard to an example of the frame rate, the display operation condition is successively changed such that, for a certain unit time period, display driving is performed at a first frame, and then for another unit time period, display driving is performed at a second frame rate.

Further, this changeover control is based on a value in an encrypted operation condition control information storage section 24 stored in the image display processing apparatus 11.

In particular, the encrypted operation condition control information storage section 24 has encrypted operation condition control information stored therein, and a changeover control section 23 reads out the encrypted operation condition control information and controls changeover of the image output processing section 22 in response to the value of the encrypted operation condition control information.

It is to be noted that also it is possible to implement operation condition control by the image output processing section 22 and changeover control by the changeover control section 23 by means of software installed, for example, in a video processor apparatus. The changeover operations are schematically illustrated in FIG. 3A and FIG. 3B.

For example, it is assumed that information of "10100-110 . . . " in FIG. 3A is stored as the encrypted operation condition control information in the encrypted operation condition control information storage section 24.

In this instance, the changeover control section 23 controls so that the image display operation condition is changed over in a unit time period of N frames as seen in FIG. 3B.

In particular, in a unit of a time period of N frames, display is executed in a display operation condition A where the value of the operation condition control information is "0" but in a display operation condition B where the value of the operation condition control information is "1".

Base on such changeover control in a unit of N frames as just described, the image output processing section 22 executes, for example, displaying or outputting in a first frame rate condition as the display operation condition A for a certain period of N frames and executes displaying or outputting at a second frame rate as the display operation condition B for another period of N frames.

An image driving signal produced under such changeover control is supplied to the display section 12 and displayed or outputted by the display section 12.

In this instance, the changeover of the display operation condition as the frame rate, scanning direction, luminance, scanning phase, scanning pattern, time position or scanning interval described above is performed between such two or more operation conditions that cannot be visually recognized readily by the audience who observe an image on the display section 12 but provides some distortion on a re-picked up image picked up by the video camera 5. For example, as an example relating to the frame rate, although the changeover is performed between the first and second frame rates as the two operation conditions, the two frame rates are selected within a range within which the changeover cannot be recognized by the audience.

On the other hand, to perform changeover of at least one item from among the items given hereinabove such as the frame rate or the scanning direction signifies that the frame rate, scanning direction or the like of an image displayed becomes different from the frame rate, scanning direction or the like upon image pickup of the video camera 5 used for image re-pickup. Therefore, on the re-picked up image, some image disorder appears based on the difference in the frame rate or the like.

Further, even if a video camera whose frame rate or the like can be varied is used, it is very difficult for the image re-picking up person side to eliminate image degradation since the frame rate or the like is changed over between two or more different values. Further, particularly since the timing at which the display operation condition (frame rate or the like) is changed over is not fixed (periodical) but is based on the encrypted operation condition control information, actually it is substantially impossible to perform changeover of a video camera used for image re-pickup in accordance with the changeover on the display.

As a result, on the re-picked up image, two states appear as a disorder condition of an image after every unit of N frames. For example, first and second conditions appear as an appearance condition of a stripe pattern or a speed condition of movement of stripes.

Or, for example, if changeover between first and second frame rates is performed and the first frame rate coincides with the frame rate of the video camera 5 used for image re-pickup, then a disorder of an image occurs within a period of the second frame. In other words, presence or absence of some disorder occurs in a unit of a period of N frames.

They provide an image condition corresponding to the value of the encrypted operation condition control information used for the changeover.

Accordingly, if an illegal copy product is produced from the re-picked up image and distributed, then the operation condition control information upon image re-pickup can be detected by analyzing the image of the copy product 6.

3. Operation Condition Control Information

The substance of the above-described operation condition control information is set by the management company 2, an image contents producing person, a copyright owner, a manager of the screening establishment 1 or the like and is used for changeover control in the image display processing apparatus 11.

The following examples may be used as the substance of the operation condition control information.

<Information Relating to an Image Itself>
- Identification number for each title of image contents of a movie or a broadcasting program
- Identification number applied uniquely to each piece of image contents when it is distributed or reproduced
- Date of production, producing person, country of production, source of distribution, genre and relating information relating to the substance or production of image contents <Information Relating to the Image Display Apparatus>
- Information for specifying the image display processing apparatus 11 used. For example, a unique identification number (serial number, product number) applied upon production to the apparatus
- Production information or type information of the image display processing apparatus 11 used. For example, the name of the maker of the apparatus, the date of production, the name of the model, the name of software for changeover control in the apparatus, or a version number.

<Information Relating to the Image Screening Establishment>
- Screening place. For example, the name, address or country/district of the screening establishment 1, or an establishment number or the like set for each establishment such as a movie theater.
- Information (name or personal ID) of the manager, owner, person in charge or the like of the establishment.
- Information (name or personal ID) of the screening stuff of the establishment.

<Information Relating to the Date and Hour of the Image Display>
- Date and hour of screening, period of screening of a road show <Information Relating to the Image Management>
- Management company information. Identification information of the management company which performs such working as prevention of image re-pickup, exercise of the right and so forth with regard to the image contents, information of the person in charge of the management company and so forth
- Copyright information. The copyright owner regarding the image contents, a person or an organization concerned regarding the copyright, whether copy is inhibited/permitted or the like

4. Modes of Display Operation Condition Changeover Based on Operation Condition Control Information In the image display processing apparatus 11 in the present embodiment, the image output processing section 22 performs changeover of the display operation condition based on encrypted operation condition control information under the control of the changeover control section 23 as described above.

Here, several examples of the mode of changeover of the display operation condition are described.

The changeover of the display operation condition is performed basically by changeover of the mode of scanning which forms a screen.

First, a vertical scanning method and a horizontal scanning method are described in regard to scanning for forming a display image with reference to FIGS. 4A, 4B and 4C and FIGS. 5A, 5B and 5C.

In an ordinary CRT (Braun tube) or projector apparatus or the like, when microscopically viewed, a frame (a screen which forms a moving picture) is drawn from dots. However, if macroscopically viewed, a horizontal line is scanned in a vertical direction (usually from above to below) to draw a frame. In other words, a scanning line of a horizontal direction (H direction) is scanned in a vertical direction (V direction) to form a frame image as seen in FIG. 5A. This is referred to as horizontal scanning method.

On the other hand, in projector apparatus and so forth which make use of a GLV (Grating Light Valve) in recent years, those apparatus have been developed wherein a vertical line is scanned in a horizontal direction to draw a frame. In particular, a scanning line of a vertical direction (V direction) is scanned in a horizontal direction (H direction) to form a frame image as seen in FIG. 4A. This is referred to as vertical scanning system.

In the present embodiment, a display apparatus which adopts any of the horizontal scanning method and the vertical scanning method can be applied.

The changeover modes of the display operation condition are described successively with reference to such figures as FIGS. 4C and 5C, and the figures signify the followings.

FIG. 4B schematically represents scanning lines of a vertical direction as square prisms where the direction of the axis of abscissa represents the time on a screen (screen S) where the vertical scanning method is applied. In short, each of the juxtaposed square prisms corresponds to one vertical scanning line, and this is successively moved in a horizontal direction to form one frame. In the figure, the time for 4 frames is indicated.

The state where FIG. 4B is viewed from above is illustrated in FIG. 4C. Accordingly, the axis of ordinate of FIG. 4C is the horizontal direction (H direction) of the screen, and the axis of abscissa represents the time.

Meanwhile, FIG. 5B schematically represents scanning lines of a horizontal direction as square prisms where the direction of the axis of abscissa represents the time on a screen (screen S) where the horizontal scanning method is applied. In short, each of the juxtaposed square prisms corresponds to one horizontal scanning line, and this is successively moved in a vertical direction to form one frame. In the figure, the time for 6 frames is indicated.

The state where FIG. 5B is viewed from sidewardly is illustrated in FIG. 5C. Accordingly, the axis of ordinate of FIG. 5C is the vertical direction (V direction) of the screen, and the axis of abscissa is the time.

In the following, examples of the scanning method, that is, the display operation condition to be changed over in the present embodiment, are described with reference to FIGS. 6A and 6B to 23 wherein the axis of ordinate represents the H direction of FIG. 4C or the V direction of FIG. 5C and the axis of abscissa represents the time. It is to be noted that "0" or "1" in the figures represents a value of the encrypted operation condition control information and the operation conditions illustrated corresponding to the values correspond to the operation conditions of A and B illustrate in FIG. 3B.

<Frame Rate Changeover>

Figure 6A:
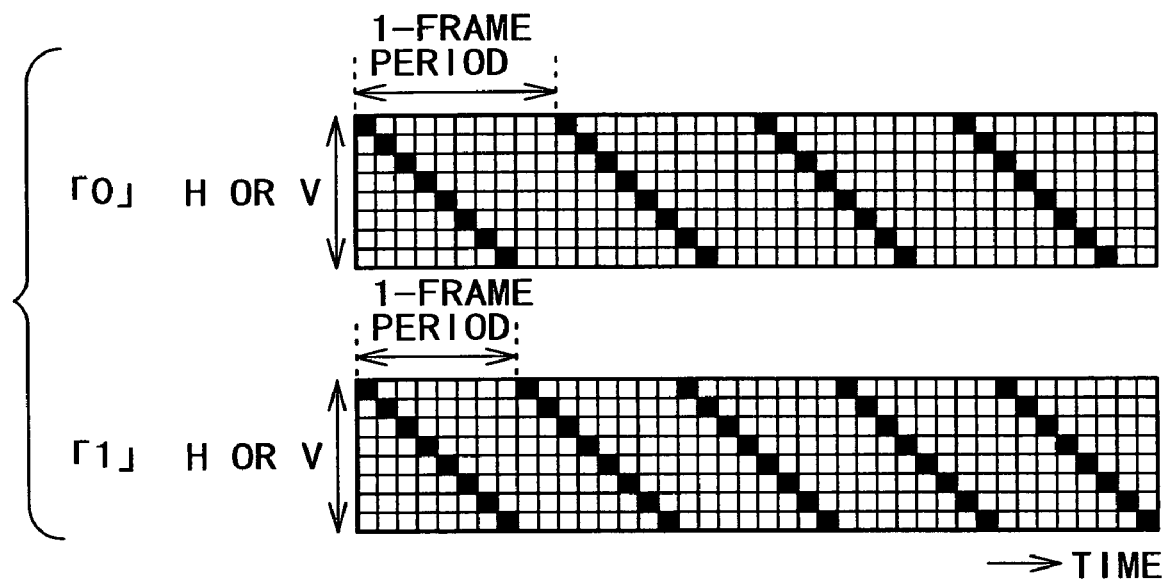
FIGS. 6A and 6B are diagrammatic views illustrating frame rate switching of the embodiment.
Figure 6B:
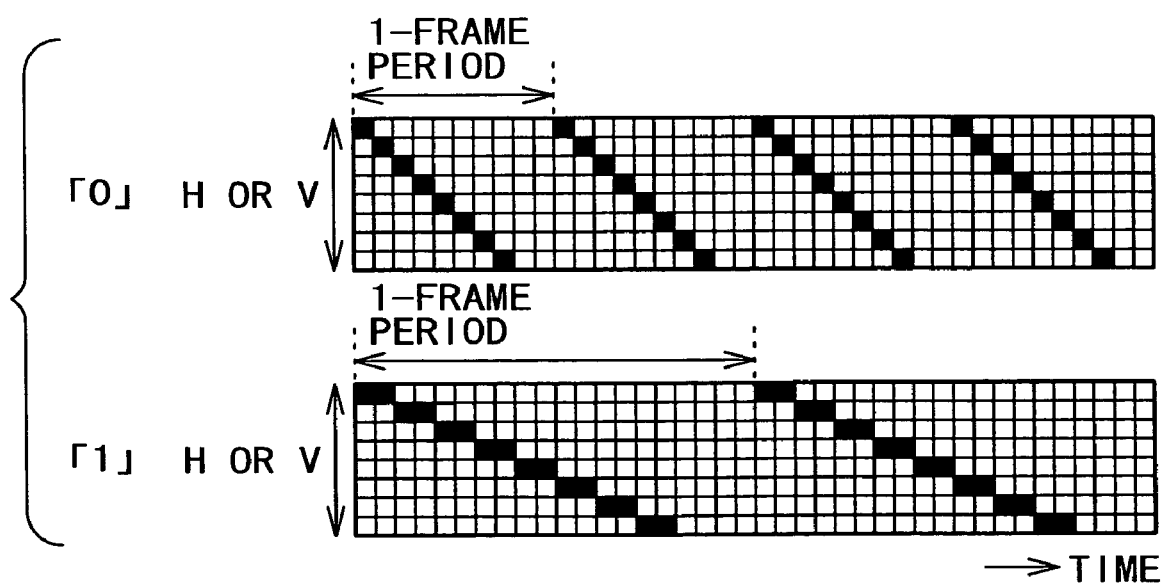

FIGS. 6A and 6B illustrate examples of the frame rate changeover.

FIG. 6A illustrates a condition wherein the frame rate is changed over in accordance with the value of "0" or "1" of the encrypted operation condition control information. For example, if the range of the time axis illustrated in the figure is assumed as one unit time period, then the frame rate is changed over such that scanning of 4 frames is performed within one unit time period in accordance with the encrypted operation condition control information of "0" whereas scanning of 5 frames is performed within one unit time period in accordance with the encrypted operation condition control information of "1".

It is to be noted that, while the figure shows "4 frames/unit time period" and "5 frames/unit time period", this is an example for simplified description and illustration at all, and actually, for example, where one second is determined as one unit time period, the number of frames for one second may be changed over between 24 frames and 30 frames or the like.

FIG. 6B illustrates a condition wherein ordinary scanning is performed in accordance with the value "0" whereas each scanning line is scanned twice in accordance with the value "1". Accordingly, the frame rate corresponding to the value "1" is one half (for example, 15 frames/one second) the frame rate (for example, 30 frames/one second) corresponding to the value "0".

It is to be noted that, where this frame rate changeover is performed, the number of scanning frames within a unit time period varies. Naturally, however, the frame number of original image data is fixed. Accordingly, in the frame rate changeover process, interpolation or sampling out of a required number of frame data is required. More particularly, where a frame rate higher than the frame rate of original image data is used, such frame interpolation as to scan a certain frame by a plural number of times is required, but where a frame rate lower than the frame rate of original image data is used, a process of sampling out a certain frame or frames is required.

<Scanning Direction Changeover>

Figure 7A:
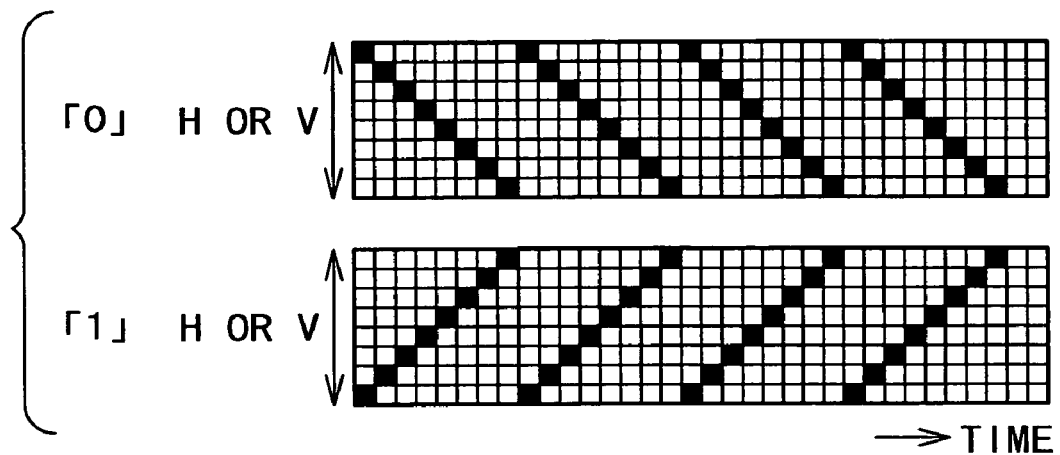
FIGS. 7A, 7B and 7C are diagrammatic views illustrating scanning direction switching of the embodiment.
Figure 7B:
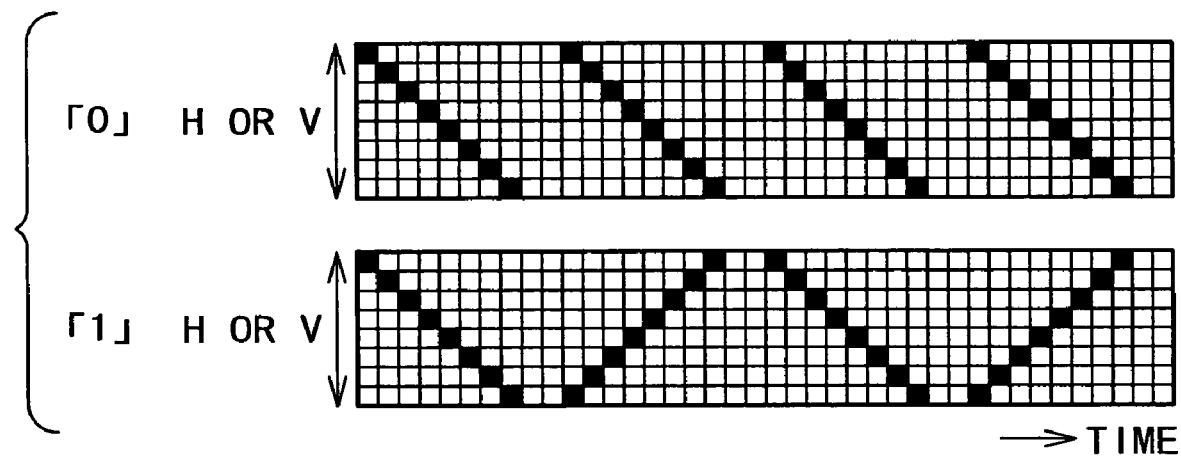
Figure 7C:
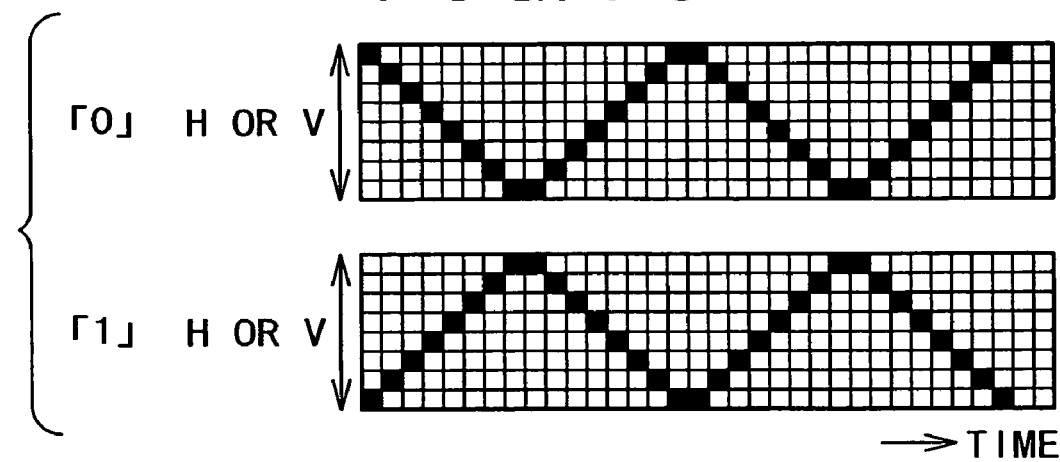

FIGS. 7A, 7B and 7C illustrate examples of the scanning direction changeover.

FIG. 7A illustrates an example wherein scanning is performed in an ordinary scanning direction in accordance with the value "0" whereas scanning is performed in the opposite direction in accordance with the value "1". For example, where the horizontal scanning method is used, changeover is performed between an operation condition that a horizontal scanning line is scanned from above to below and another condition that a horizontal scanning line is scanned from below to above. On the other hand, where the vertical scanning method is used, changeover is performed between an operation condition that a vertical scanning line is scanned from the left to the right and another condition that a horizontal scanning line is scanned from the right to the left.

FIG. 7B illustrates an example wherein scanning is performed in an ordinary scanning direction in accordance with the value "0" whereas the scanning direction is reversed after every frame in accordance with the value "1". In particular, when the value is "1", where the horizontal scanning method is used, scanning from above to below and scanning from below to above of a horizontal scanning line are executed alternately. On the other hand, where the vertical scanning method is used, scanning from the left to the right and scanning from the right to the left of a vertical scanning line are executed alternately.

FIG. 7C illustrates an example wherein, although the scanning direction is reversed after every one frame in both cases wherein the value is "0" and "1", the opposite scanning directions to each other are used depending upon whether the value is "0" or "1".

<Luminance Changeover>

Figure 8A:
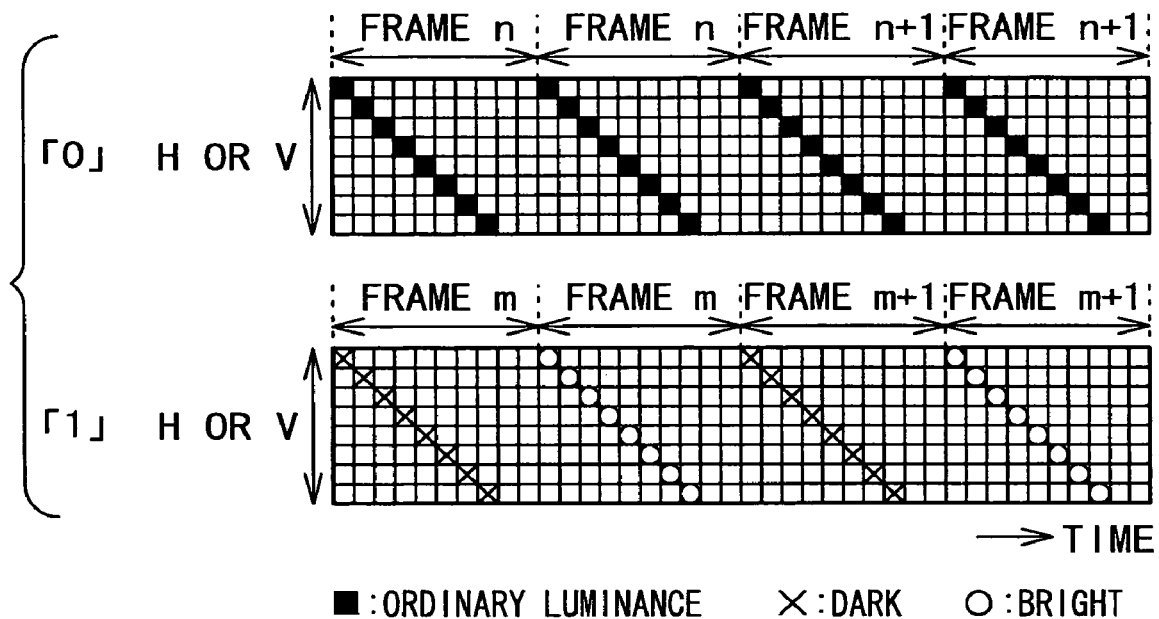
FIGS. 8A and 8B are diagrammatic views illustrating luminance switching of the embodiment.
Figure 8B:
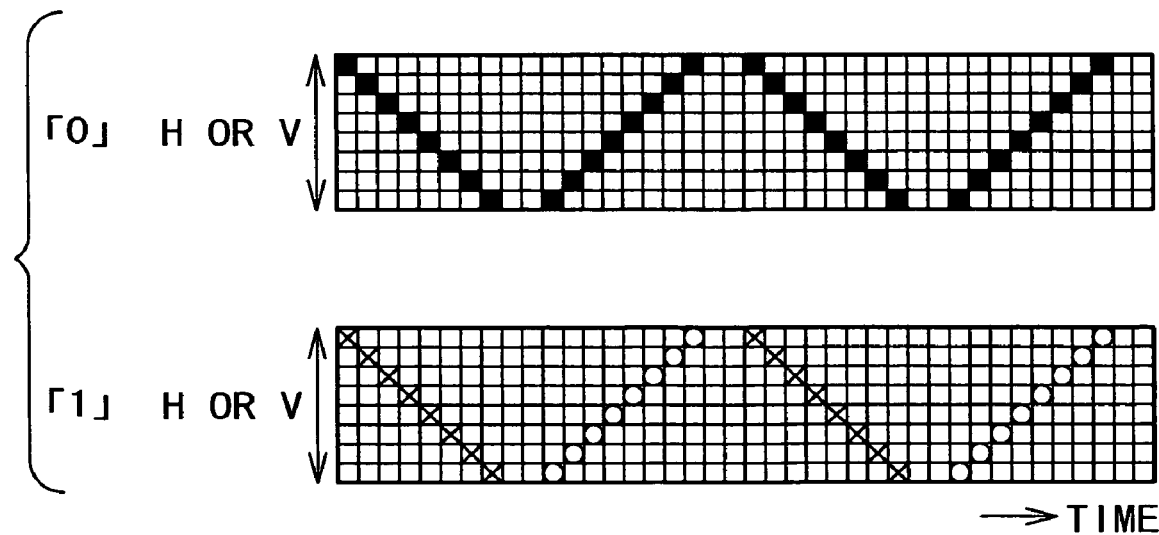

FIGS. 8A and 8B illustrate examples of luminance changeover.

In the example of FIG. 8A, when the value is "0", scanning is performed with an ordinary luminance, but when the value is "1", scanning with a low luminance (dark: x) and scanning with a high luminance (bright: ○) are performed alternately.

In short, when the value is "1", one frame is displayed with a luminance different from an ordinary luminance.

However, if the luminance is changed over simply, then the display screen becomes darker (or brighter) within a period corresponding to the value "1" than within a period corresponding to the value "0". Therefore, the luminance variation is recognized by the audience, and the audience may consider that the displayed image is an image of low quality.

Therefore, each one frame is scanned twice first. For example, the scanning speed is set to twice, and when the value is "0", frames are scanned with an ordinary luminance twice by twice like frame n→frame n→frame n+1→frame n+1 . . . . Also when the value is "1", frames are scanned twice by twice like frame m→frame m→frame m+1→frame m+1 . . . similarly. However, a technique is taken that, upon scanning of the same frame, a raised brightness is used in one of the two scanning cycles whereas a lowered brightness is used in the other scanning cycle thereby to average the luminance. Consequently, no variation in luminance on the visual sense occurs between the period of the value "0" and the period of the value "1".

It is to be noted that, in order to average the luminance level, it is appropriate to make the rate of luminance change such that, for the state of the high luminance of ○, the luminance is raised by A% with respect to the normal luminance whereas, for the state of the low luminance of x, the luminance is lowered by A% with respect to the normal luminance.

In FIG. 8B, as a basic scanning direction, the scanning direction is reversed after every one frame irrespective of whether the value is "0" or "1". Changeover of the scanning direction in response the value of "0" or "1" is not performed. Then, different luminance levels are used for the case of the value "0" and the case of the value "1". In particular, when the value is "0", scanning is performed with the normal luminance, but when the value is "1", scanning with the low luminance (dark: x) and scanning with the high luminance (bright: ○) are performed alternately.

Also in this instance, in order to cause the luminance variation not to be recognized by the audience, the low luminance and the high luminance are averaged to a level equal to that of the normal luminance.

<Phase Changeover>

FIG. 9 illustrates an example of phase changeover.

When the value is "0", scanning is performed with a normal phase, but when the value is "1", scanning is performed in a phase condition different from that of the normal phase. In the example illustrated, the phases of the scanning lines are different from each other by 180 degrees.

<Pattern Changeover>

FIG. 10 illustrates an example wherein the scanning pattern is changed over.

When the value is "0", the scanning pattern is such that the scanning direction is reversed after every one frame.

When the value is "1", the scanning pattern is such that, although the scanning direction is reversed after every one frame, for scanning in one direction, the same scanning line is scanned twice.

<Time Position Changeover>

Figure 11A:
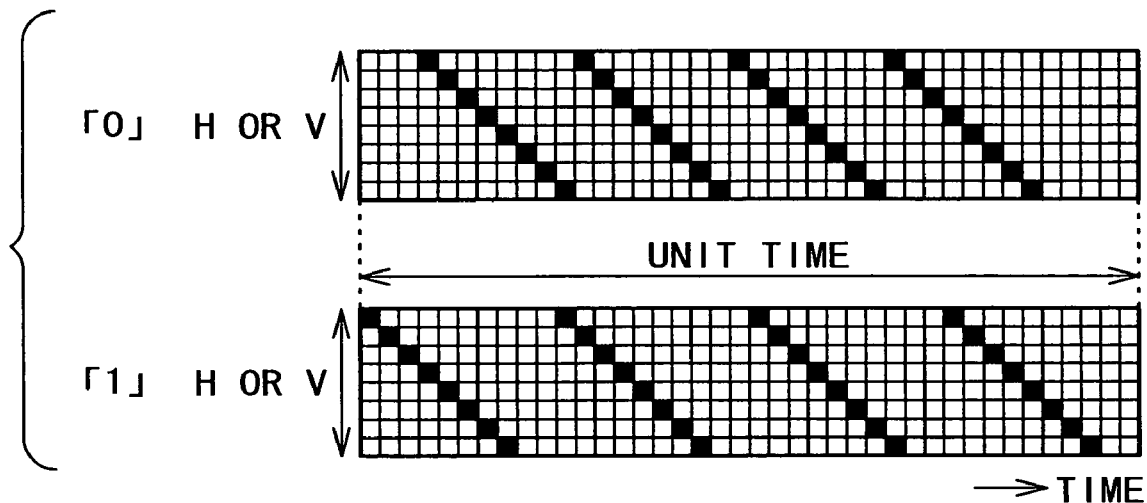
FIGS. 11A and 11B are diagrammatic views illustrating time position switching of the embodiment.
Figure 11B:
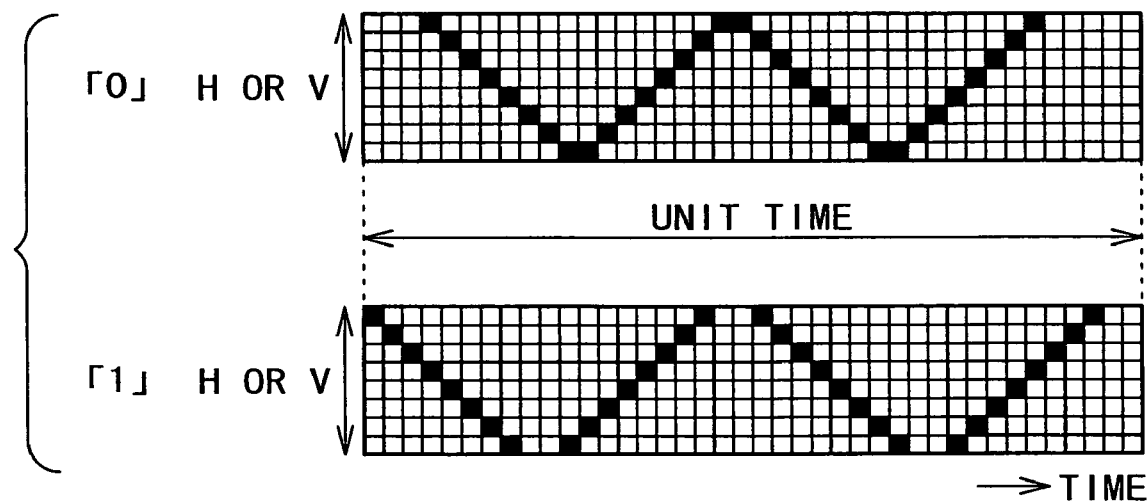

Time position changeover of FIGS. 11A and 11B is performed such that, although the number frames scanned within one unit time period are equal, the timing at which scanning is performed is changed over.

In the case of FIG. 11A, when the value is "0", the starting timing of the first frame within a unit time period is retarded and then succeeding frames are scanned without any interruption. When the value is "1", each frame is scanned after every predetermined period of time within a unit time period.

Consequently, the time positions in frame scanning within a unit time period are varied depending upon the values "0" and "1" as seen in the figure.

In FIG. 11B, as a basic scanning direction, the scanning direction is reversed after every one frame irrespective of whether the value is "0" or "1". Changeover of the scanning direction in response the value of "0" or "1" is not performed. However, when the value is "0", the starting timing of the first frame within a unit time period is retarded and then succeeding frames are scanned without any interruption. When the value is "1", each frame is scanned after every predetermined period of time within a unit time period beginning with the first timing within the unit time period. Consequently, the time positions in frame scanning within a unit time period are varied depending upon the values "0" and "1" as seen in the figure.

<Interval Changeover>

FIGS. 12A and 12B illustrate examples of interval changeover.

In FIG. 12A, when the value is "0", frames are scanned without any interruption (time interval d=0), but when the value is "1", each frame is scanned after a predetermined interval of time set to a time interval d.

In the example of FIG. 12B, as a basic scanning direction, the scanning direction is reversed after every one frame irrespective of whether the value is "0" or "1". Although changeover of the scanning direction is not performed in response to the value "0" or "1", the interval d between frame scanning operations is changed over depending upon whether the value is "0" or "1".

It is to be noted that, in the interval changeover examples of FIGS. 12A and 12B, the time length for scanning of a predetermined number of frames differs depending upon whether the value is "0" or "1" as seen from the figures. For example, while the scanning period for 4 frames is shown in the figures, the time required to scan four frames is longer where the value is "1".

In the case of such variable length changeover, in order to fix the total period of time, it is necessary to make the frequencies of appearance of the values of "0" and "1" of the encrypted operation condition control information equal to each other within the fixed data length.

For example, while FIG. 3C illustrates a case wherein the time lengths of the operation conditions A and B are different from each other although they are scanning periods for equal N frames, the case corresponds to a case wherein such changeover as illustrated in FIG. 12A or 12B is performed.

In this instance, if it is assumed that the unit of operation condition control information is 8 bits, then if each of the values "0" and "1" appears four times as seen in FIG. 3A, then the time length within a period corresponding to the 8 bits is fixed. In other words, the time length corresponds to a period of 8 bits of FIG. 3C becomes equal to the time length corresponding to a period of 8 bits of FIG. 3B.

In other words, when variable length changeover is performed, the encrypted operation condition control information should be encoded such that the probabilities of appearance of "0" and "1" within a certain unit bit length period finally become equal to each other.

In the examples of FIGS. 6A and 6B to 12A and 12B described above, one of changeover of the frame rate, changeover of the scanning direction, changeover of the luminance, changeover of the scanning phase, changeover of the scanning pattern, changeover of the scanning time position and changeover of the scanning interval is performed as changeover of the display operation condition. Since also changeover of the operation condition which involves two or more of the changeover items is possible, such examples are described below.

<Luminance+Direction Changeover>

Figure 13A:
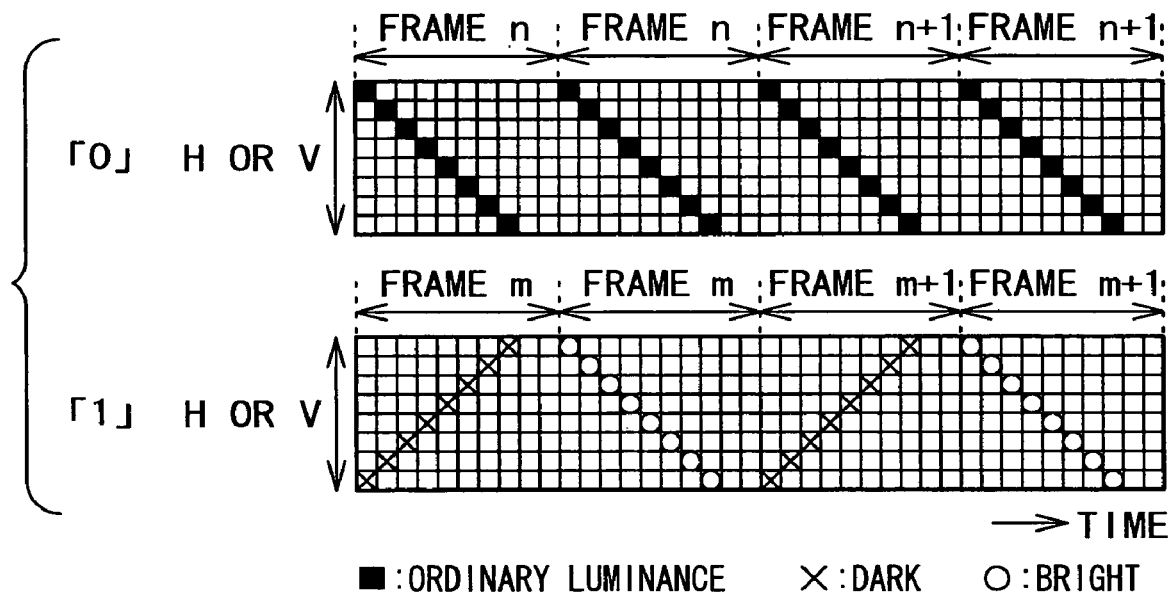
FIGS. 13A and 13B are diagrammatic views illustrating luminance+scanning direction switching of the embodiment.
Figure 13B:
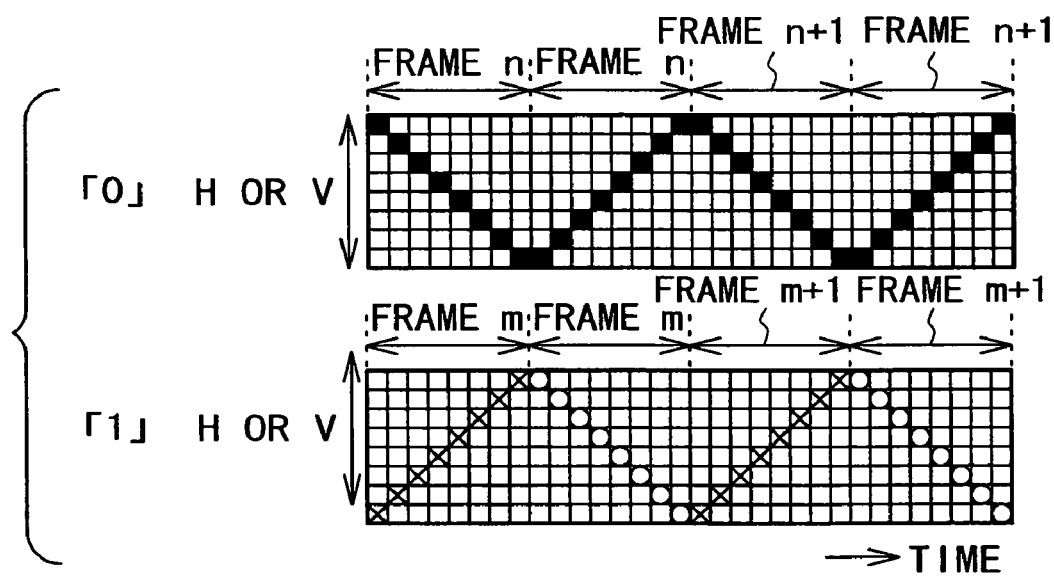

FIGS. 13A and 13B illustrate examples wherein both of the luminance and the scanning direction are changed over.

In the example of FIG. 13A, when the value is "0", scanning is performed with a normal luminance, but when the value is "1", scanning with a low luminance (dark: x) and luminance with a high luminance (bright: o) are performed alternately and the scanning direction is reversed after every one frame.

In the example of FIG. 13B, when the value is "0", the scanning direction is reversed after every one frame and scanning is performed with a normal luminance. However, when the value is "1", the scanning direction is reversed after every one frame and scanning with a low luminance (dark: x) and scanning with a high luminance (bright: o) are performed alternately. The scanning direction is reversed depending upon whether the value is "0" or "1".

It is to be noted that, also in the cases of FIGS. 13A and 13B, similarly as in the cases described hereinabove with reference to FIGS. 8A and 8B, one frame is scanned twice at a twice rate such that two scanning operations are performed as scanning of a frame with the high luminance and scanning of a frame with the low luminance while the rates of luminance change in high luminance scanning and low luminance scanning are set equal to each other so that no luminance variation on the visual sense may occur.

<Time Position+Direction Changeover>

Figure 14A:
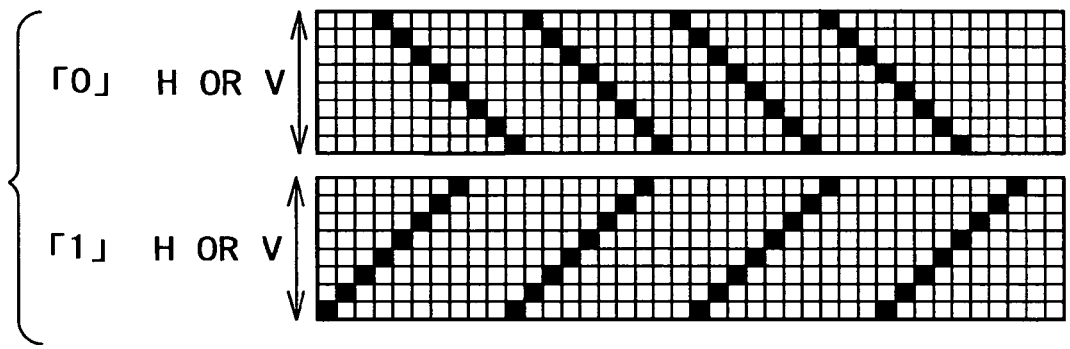
FIGS. 14A and 14B are diagrammatic views illustrating time position+direction switching of the embodiment.
Figure 14B:
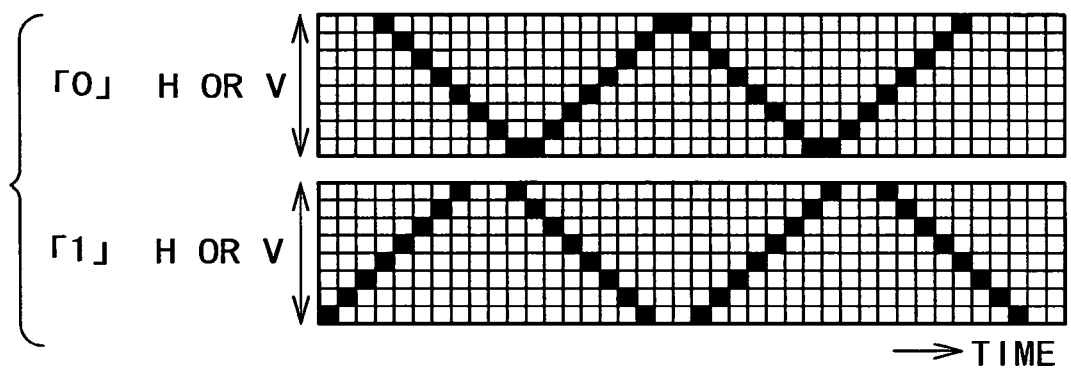

FIGS. 14A and 14B illustrate examples wherein both of the time position and the scanning direction are changed over.

In the example of FIG. 14A, when the value is "0", scanning is performed in a normal scanning direction. However, after the starting timing of the first frame within a unit time period is retarded, the frames in the unit time period are scanned without any interruption. When the value is "1", the scanning direction is reversed, and each frame in a unit time period is scanned after a predetermined interval of time beginning with the starting timing within the unit time period.

In the example of FIG. 14B, as a basic scanning direction, the scanning direction is reversed after every one frame irrespective of whether or not the value is "0" or "1". However, the scanning direction is reversed depending upon whether the value is "0" or "1". Further, when the value is "0", the starting timing of the first frame within a unit time period is retarded, and then the frames in the unit time period are scanned without any interruption. When the value is "1", each frame in a unit time period is scanned after a predetermined interval of time beginning with the starting timing within the unit time period.

<Phase+Direction Changeover>

Figure 15A:
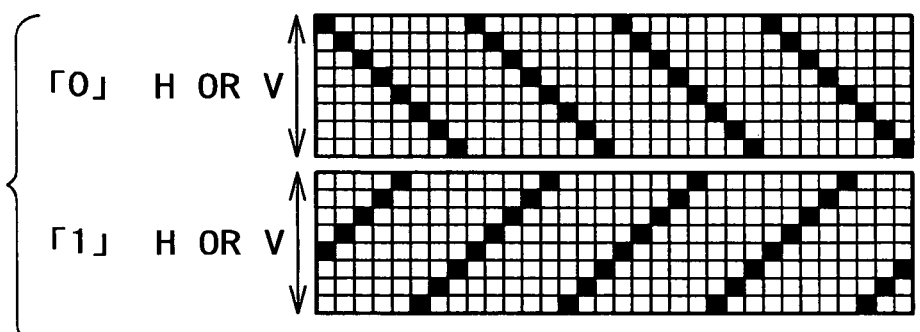
FIGS. 15A and 15B are diagrammatic views illustrating phase+direction switching of the embodiment.
Figure 15B:
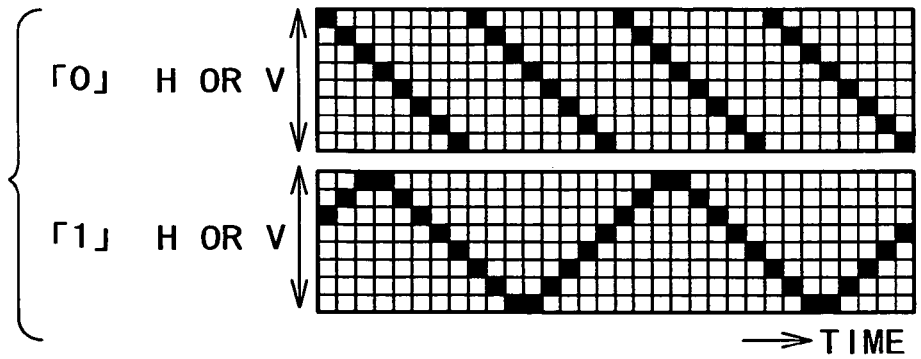

FIGS. 15A and 15B illustrate examples wherein both of the phase and the scanning direction of a scanning line are changed over.

In the example of FIG. 15A, when the value is "0", scanning is performed in a normal scanning direction with a normal phase. However, when the value is "1", the scanning direction is reversed and the phase of the scanning line is varied, for example, by 180 degrees.

In the example of FIG. 15B, when the value is "0", scanning is performed in a normal scanning direction with a normal phase. However, when the value is "1", the phase of the scanning line is varied, for example, by 180 degrees and the scanning direction is reversed after every one frame.

<Interval+Direction Changeover>

Figure 16A:
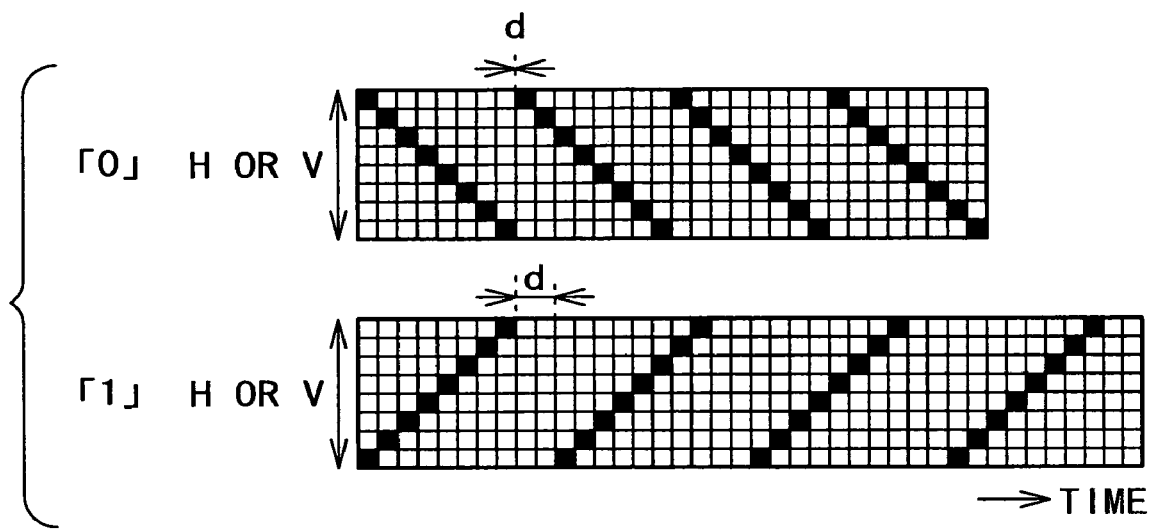
FIGS. 16A and 16B are diagrammatic views illustrating interval+direction switching of the embodiment.
Figure 16B:
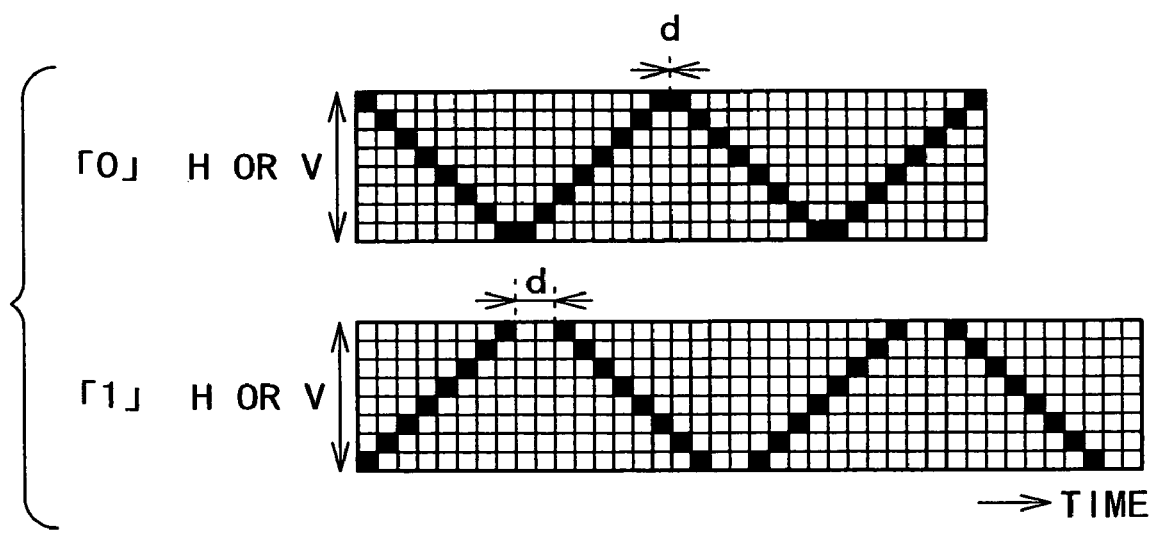
Figure 17:
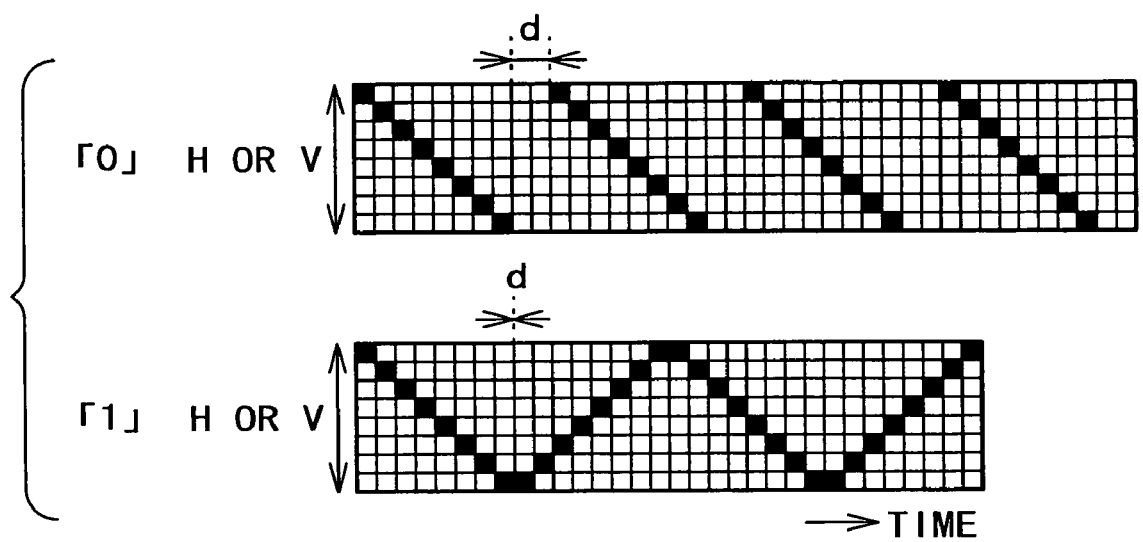
FIG. 17 is a diagrammatic view illustrating interval+direction switching of the embodiment.

FIGS. 16A, 16B and 17 illustrate examples wherein both of the interval and the scanning direction are changed over.

In the example of FIG. 16A, when the value is "0", scanning is performed in a normal scanning direction and frames are scanned without any interruption (time interval d=0). However, when the value is "1", the scanning direction is reversed and each frame is scanned after a predetermined interval of time given as a time interval d.

In the example of FIG. 16B, as a basic scanning direction, the scanning direction is reversed after every one frame irrespective of whether or not the value is "0" or "1". Further, the scanning direction is reversed irrespective of whether the value is "0" or "1". Further, the time interval given as an interval d in scanning of frames is changed over depending upon whether the value is "0" or "1".

In the example of FIG. 17, when the value is "0", scanning is performed in a normal scanning direction and each frame is scanned after a predetermined interval of time given as a time interval d. When the value is "1", the scanning direction is reversed after every one frame and the frames are scanned without any interruption (time interval d=0).

It is to be noted that, since all of the examples of FIGS. 16A, 16B and 17 adopt variable length changeover similarly to the examples of FIGS. 12A and 12B, in order to fix the total period of time, it is necessary to make the frequencies of appearance of the values of "0" and "1" of the encrypted operation condition control information equal to each other within the fixed data length.

<Frame Rate+Interval+Direction Changeover>

Figure 18:
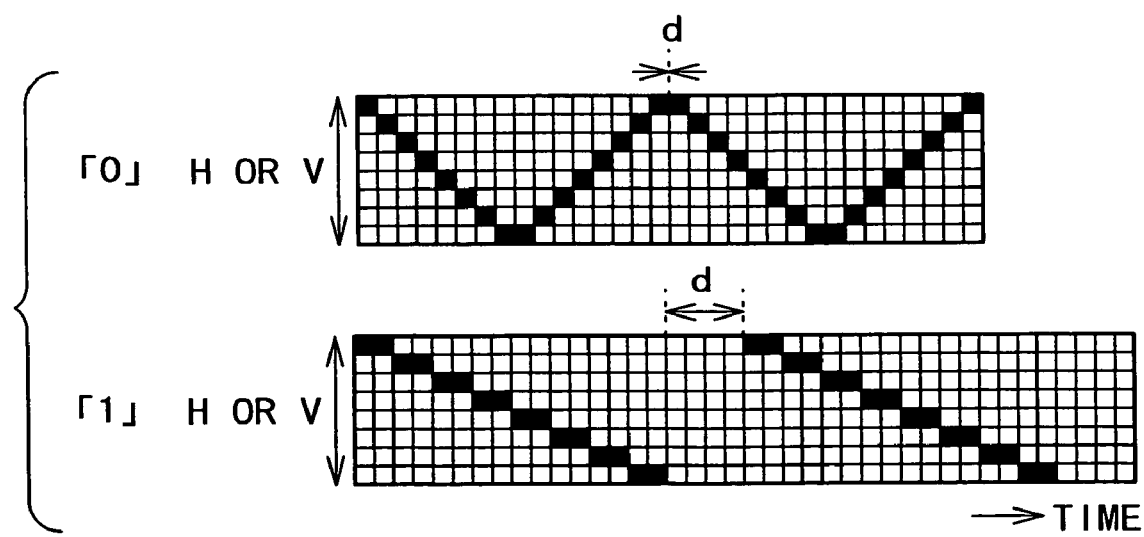
FIG. 18 is a diagrammatic view illustrating frame rate+interval+direction switching of the embodiment.

FIG. 18 illustrates an example wherein all of the frame rate, interval and scanning direction are changed over.

When the value is "0", the scanning direction is reversed after every one frame and frames are scanned without any interruption (time interval d=0). When the value is "1", the scanning direction is fixed to one direction, and each scanning line in one frame is scanned twice. Further, the scanning of each frame is performed after a predetermined interval of time given as a time interval d. In this instance, when the value is "1", the frame rate becomes reduced to ½.

It is to be noted that, since also the example of FIG. 18 adopts variable length changeover similar to those of FIGS. 12A and 12B, in order to fix the total period of time, it is necessary to make the frequencies of appearance of the values of "0" and "1" of the encrypted operation condition control information equal to each other within the fixed data length.

While several examples wherein a plurality of changeover items are used in combination are described above with reference to FIGS. 13A and 13B to 18, further various combinations of different changeover items are possible.

Furthermore, also methods wherein a hysteresis is provided to the variation of an operation condition to be changed over are possible. Several examples are described with reference to FIGS. 19 to 24.

<Direction Changeover with a Hysteresis>

Figure 19:
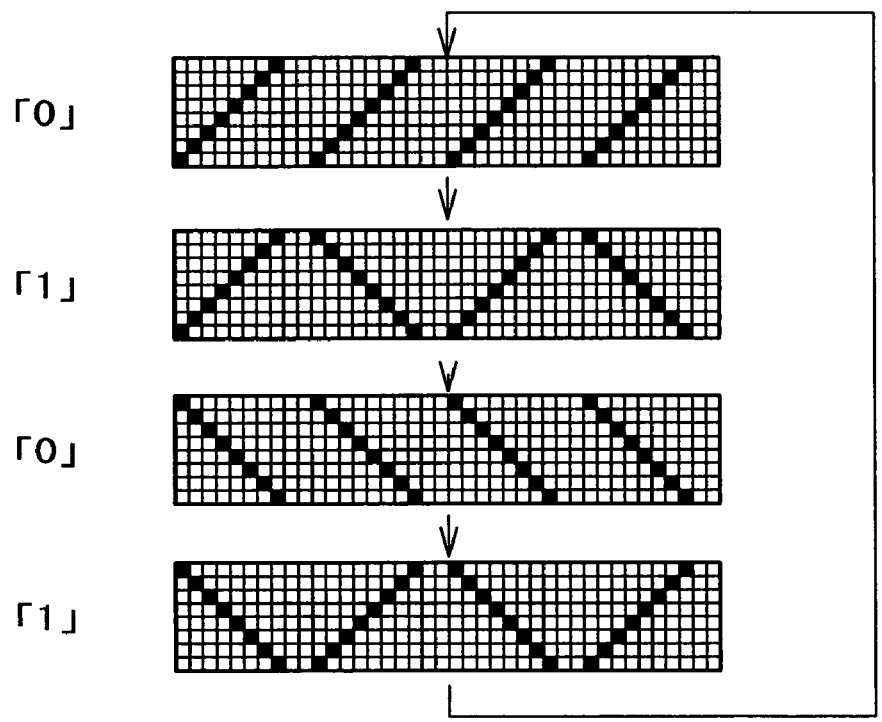
FIG. 19 is a diagrammatic view illustrating direction switching with a hysteresis of the embodiment.

FIG. 19 illustrates an example of direction changeover with a hysteresis. In the present example, when the value is "0", the scanning direction is fixed to one direction (the scanning directions of the frames are the same direction), but when the value is "1", the scanning direction is set to the opposite directions (reversed after every one frame).

Further, when the value is "0", two scanning conditions in each of which one fixed direction is used for the scanning direction are set as seen in the figure, and when the value is "1", two scanning conditions in each of which the opposite directions are used for the scanning direction are set as seen in the figure.

Further, changeover of the operation condition based on the value of the encrypted operation condition control information (based on a variation between "0" and "1") among the four scanning conditions is performed in order as seen in the figure.

<Direction+Time Position Changeover with a Hysteresis>

Figure 20:
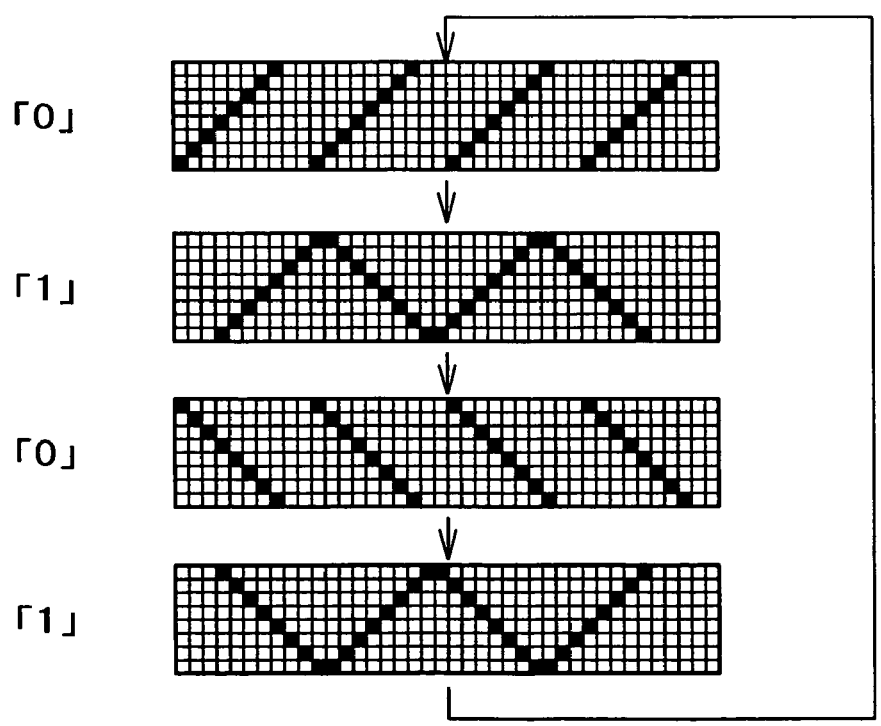
FIG. 20 is a diagrammatic view illustrating direction+time position switching with a hysteresis of the embodiment.

FIG. 20 illustrates an example wherein the two items of the scanning direction and the time position are changed over with a hysteresis.

When the value is "0", the scanning direction is fixed to one direction (the scanning directions of the frames are the same direction) and each frame is scanned after a predetermined interval of time beginning with the starting time within a unit time period.

When the value is "1", the scanning direction is set to the opposite directions (reversed after every one frame) and frames are scanned without any interruption after the starting timing of the first frame within a unit time period is retarded.

Further, for each of the values of "0" and "1", two scanning conditions are set, and changeover is performed in order as seen in the figure among the four scanning conditions.

<Direction+Frame Rate Changeover with a Hysteresis>

Figure 21:
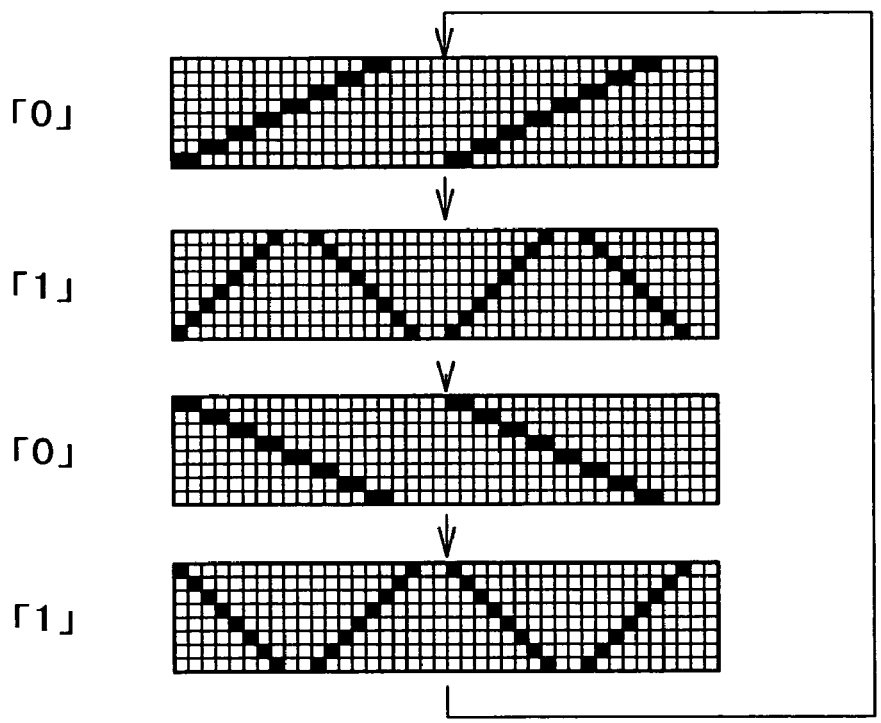
FIG. 21 is a diagrammatic view illustrating direction+frame rate switching with a hysteresis of the embodiment.

FIG. 21 illustrates an example wherein two items of the scanning direction and the frame rate are changed over with a hysteresis.

When the value is "0", the scanning direction is fixed to one direction (the scanning directions of the frames are the same direction) and the frame rate is set to ½. In other words, each scanning line is scanned twice.

When the value is "1", the scanning direction is set to the opposite directions (reversed after every one frame) and a normal frame rate is used.

Further, for each of the values of "0" and "1", two scanning conditions are set, and changeover is performed in order as seen in the figure among the four scanning conditions.

<Direction+Frame Rate+Time Position Changeover with a Hysteresis>

Figure 22:
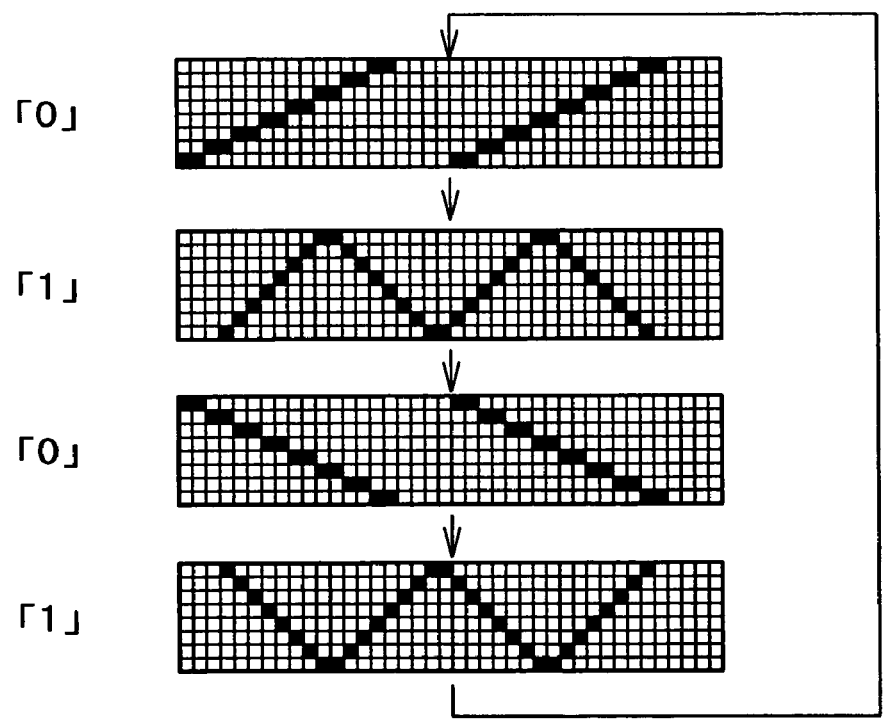
FIG. 22 is a diagrammatic view illustrating direction+frame rate+time position switching with a hysteresis of the embodiment.

FIG. 22 illustrates an example wherein three items of the scanning direction, frame rate and time position are changed over with a hysteresis.

When the value is "0", the scanning direction is fixed to one direction (the scanning directions of the frames are the same direction) and the frame rate is set to ½. In other words, each scanning line is scanned twice. Further, frames within a unit time period are scanned without any interruption after the starting timing of the first frame within the unit time period is retarded.

When the value is "1", the scanning direction is set to the opposite directions (reversed after every one frame) and a normal frame rate is used.

Further, for each of the values of "0" and "1", two scanning conditions are set, and changeover is performed in order as seen in the figure among the four scanning conditions.

<Direction+Interval Changeover with a Hysteresis>

Figure 23:
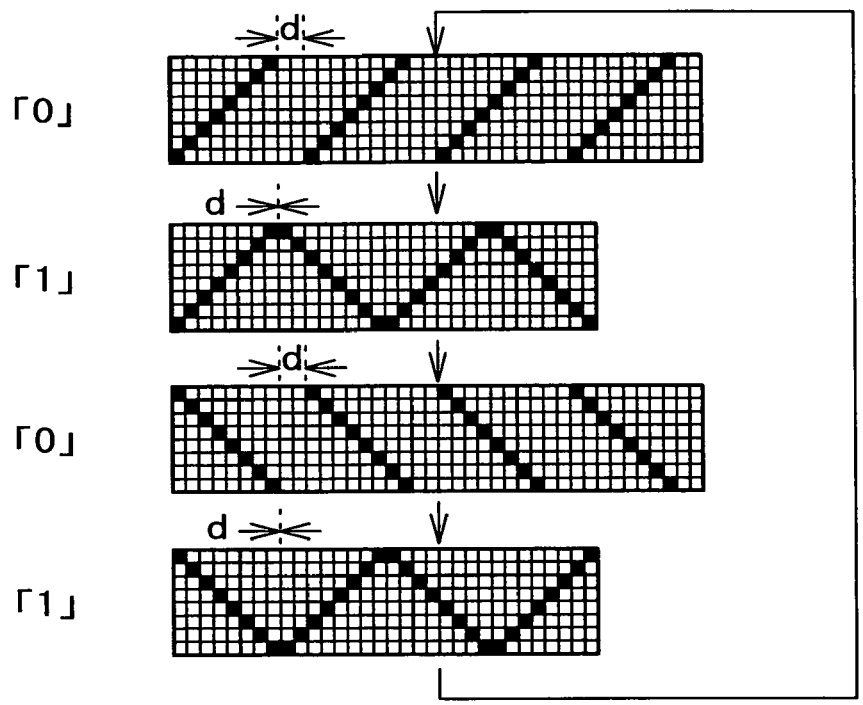
FIG. 23 is a diagrammatic view illustrating direction+interval switching with a hysteresis of the embodiment.

FIG. 23 illustrates an example wherein two items of the scanning direction and the interval are changed over with a hysteresis.

When the value is "0", the scanning direction is fixed to one direction (the scanning directions of the frames are the same direction) and the scanning of each frame is performed after a predetermined interval of time given as a time interval d.

When the value is "1", the scanning direction is set to the opposite directions (reversed after every one frame) and frames are scanned without any interruption (time interval d=0).

Further, for each of the values of "0" and "1", two scanning conditions are set, and changeover is performed in order as seen in the figure among the four scanning conditions.

It is to be noted that, since variable length changeover is adopted similarly to the examples of FIGS. 12A and 12B, in order to fix the total period of time, it is necessary to make the frequencies of appearance of the values of "0" and "1" of the encrypted operation condition control information equal to each other within the fixed data length.

<Direction+Frame Rate+Interval Changeover with a Hysteresis>

Figure 24:
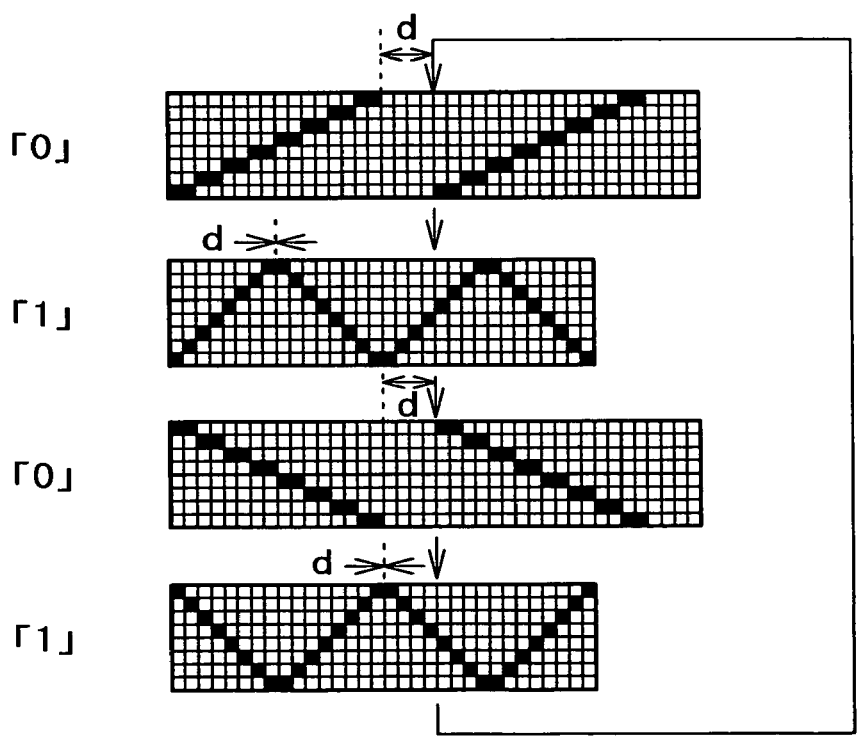
FIG. 24 is a diagrammatic view illustrating direction+frame rate+interval switching with a hysteresis of the embodiment.

FIG. 24 illustrates an example wherein three items of the scanning direction, frame rate and interval are changed over with a hysteresis.

When the value is "0", the scanning direction is fixed to one direction (the scanning directions of the frames are the same direction) and the frame rate is set to ½. In other words, each scanning line is scanned twice. Further, the scanning of each frame is performed after a predetermined interval of time given as a time interval d.

When the value is "1", the scanning direction is set to the opposite directions (reversed after every one frame) and a normal frame rate is used. Further, frames are scanned without any interruption (time interval d=0).

Further, for each of the values of "0" and "1", two scanning conditions are set, and changeover is performed in order as seen in the figure among the four scanning conditions.

It is to be noted that, since variable length changeover is adopted similarly to the examples of FIGS. 12A and 12B, in order to fix the total period of time, it is necessary to make the frequencies of appearance of the values of "0" and "1" of the encrypted operation condition control information equal to each other within the fixed data length.

In the foregoing, examples wherein one of the changeover items of frame rate, scanning direction, luminance, scanning phase, scanning pattern, time position and scanning interval is performed are described with reference to FIGS. 6A and 6B to 12A and 12B and examples wherein a plurality of changeover items are combined are described with reference to FIGS. 13A to 13B to 18 as examples of operation condition changeover. Further, examples wherein a plurality of scanning conditions are set for each of the values of "0" and "1" of the encrypted operation condition control information and are successively changed over are described with reference to FIGS. 19 to 24.

Naturally, very various conditions wherein a single changeover item or a plurality of changeover items in combination are involved are possible in addition to the examples described above.

Some of the operation condition changeover modes including the examples described above and those which are not described specifically causes, when the image is re-picked up using the video camera 5, a difference or displacement to be produced from the frame rate, scanning direction, timing of scanning, sensitivity to the luminance and so forth of the video camera 5, and this degrades the re-picked up image.

On the other hand, according to the changeover modes, the audience observing the display section 12 will not recognize any variation. In other words, the displayed image does not suffer from visual degradation, but image degradation appears only when the displayed image is re-picked up by the video camera 5.

It is to be noted that the technique of causing the audience not to recognize changeover of an operation condition has been described in connection with luminance changeover with reference to FIGS. 8A and 8B. In short, since a variation in luminance is likely to be recognized by the audience, it is averaged to apparently make the luminance uniform.

As regards the scanning direction, phase, interval, time position and so forth, no such variation that may be recognized by the audience appears on the screen.

However, when the frame rate is changed over, such changeover may possibly be recognized by the audience if no countermeasure is taken.

For example, when the scanning is changed over between scanning at the frame rate A (Hz) and scanning at the frame rate B (Hz), A frames are displayed per one second in the former case whereas B frames are displayed per one second in the latter case. Therefore, within the period of the frame rate B, the displayed image has a luminance as high as B/A times that within the period of the frame A.

This difference in luminance may possibly be recognized, depending upon the value, by the audience.

Therefore, it is suitable to adopt such a technique as to multiply the luminance within the period of the frame rate B by A/B (or multiply the luminance within the period of the frame rate A by B/A) so that a variation in luminance may not occur.

For the process just described, a method of adjusting the brightness of the light source of a projector apparatus or the like, another method of varying the display time and a further method of multiplying image data by a coefficient corresponding to the luminance level ratio are available.

5. Embedding Methods of Operation Condition Control Information

Now, examples of a method of storing encrypted operation condition control information into the image display processing apparatus 11 in order to execute the display operation condition changeover described above are described.

As described hereinabove with reference to FIG. 2, in the image display processing apparatus 11, it is necessary for encrypted operation condition control information to be stored into the encrypted operation condition control information storage section 24 prior to screening.

Various examples are possible as the substance of the operation condition control information as described hereinabove. FIGS. 25 to 30 illustrate various examples of a procedure until encrypted operation condition control information is stored into the encrypted operation condition control information storage section 24.

The substance of the operation condition control information DT is such as those in the examples as described hereinabove (information regarding an image itself, information regarding an image display apparatus, information regarding an image display establishment, information regarding the date and hour of image display and information regarding image management). The substance is set by the management company 2 or inputted in a predetermined procedure by the stuff of the screening establishment. It is to be noted that, though not shown, the image contents producer side or an apparatus maker 3 which produces the image display processing apparatus 11 may provide information regarding the apparatus as operation condition control information.

For example, where the substance of the operation condition control information DT is to be produced by the management company 2 and information regarding an image itself should be included, the management company to which the description substance is provided from the producing person side of the image contents may produce the operation condition control information DT.

On the other hand, where information regarding an image display apparatus should be included, the management company which receives provision of the description substance from the apparatus maker 3 may produce the operation condition control information DT.

Where information regarding the image display establishment or information regarding the date and hour of image display should be included, the management company which receives the description contents from the distribution company or the screening establishment 1 may produce the operation condition control information DT.

Where information regarding image management should be included, the management company may produce the operation condition control information DT based on the management substance in the management company 2 or information of the description substance received from the copyright owner or the like.

Although the management company 2 can produce operation condition control information DT in this manner, similar production may be executed by the screening establishment 1 side. Furthermore, the apparatus maker 3, distribution company, contents producer or copyright owner may produce and provide the operation condition control information DT itself. Actually, in what manner the operation condition control information DT should be produced may be determined depending upon the substance included in the operation condition control information DT, a form of business, a form of contract and so forth.

The operation condition control information DT produced in this manner is delivered in the form of a document, electronic data communication, an electronic data recording medium such as a disk or a tape or the like and is finally stored in an encrypted state into the encrypted operation condition control information storage section 24 of the image display processing apparatus 11.

For the encryption method, a public key encryption method wherein a public key PK and a secret key SK are used in pair is used. As seen in FIG. 1, the management company 2 retains the public key PK and the secret key SK.

Figure 25:
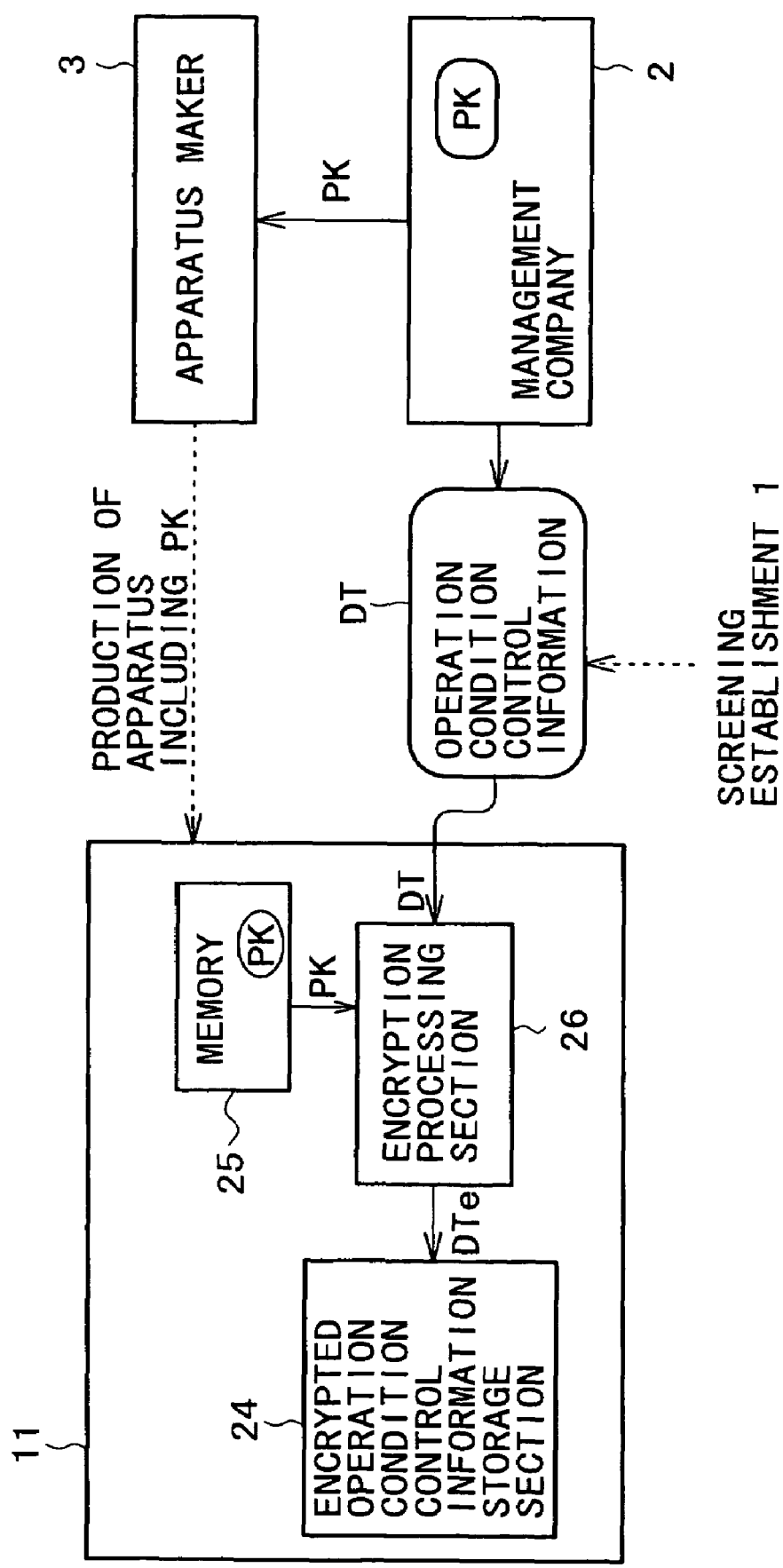
FIG. 25 is a diagrammatic view illustrating an example of a mode of production of operation condition control information of the embodiment.

FIG. 25 illustrates an example wherein the apparatus maker 3 stores, upon production of the image display processing apparatus 11, the public key PK into an internal memory 25 and ships the image display processing apparatus 11.

The apparatus maker 3 receives the public key PK from the management company 2 upon production.

After the apparatus maker 3 produces the image display processing apparatus 11, it stores the public key PK into the memory 25 before shipment of the image display processing apparatus 11.

The shipped image display processing apparatus 11 is supplied, for example, to the screening establishment 1. The screening establishment 1 receives (or produces) operation condition control information DT upon screening of certain image contents.

The operation condition control information DT is inputted to the image display processing apparatus 11 and supplied to an encryption processing section 26 in the image display processing apparatus 11. The encryption processing section 26 uses the public key PK stored in the memory 25 to encrypt the operation condition control information DT to produce encrypted operation condition control information DTe and stores the encrypted operation condition control information DTe into the encrypted operation condition control information storage section 24.

Based on the encrypted operation condition control information DTe stored in this manner, the changeover control section 23 described hereinabove with reference to FIG. 2 performs changeover control of the image output processing section 22.

Figure 26:
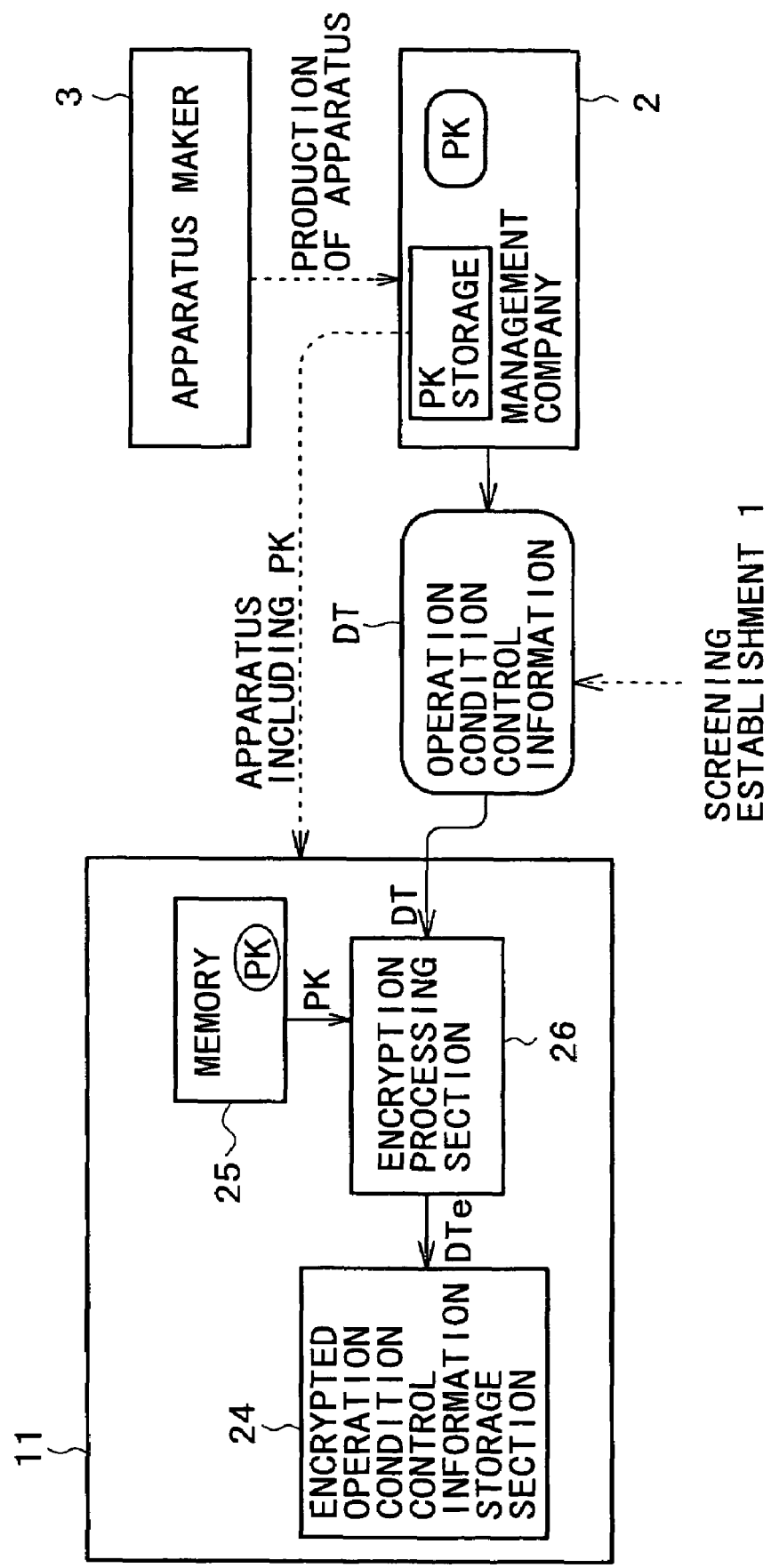
FIG. 26 is a diagrammatic view illustrating another example of a mode of production of operation condition control information of the embodiment.

FIG. 26 illustrates an example wherein the management company 2 stores the public key PK into the internal memory 25 in the image display processing apparatus 11.

The management company 2 stores the public key PK into the internal memory 25 of the image display processing apparatus 11 produced by the apparatus maker 3. Naturally, such storage may be performed after the image display processing apparatus 11 is supplied to the screening establishment 1. For example, the stuff of the management company 2 visits the screening establishment 1 and performs an operation of storing the public key PK into the image display processing apparatus 11.

The screening establishment 1 receives (or produces) operation condition control information DT upon screening of certain image contents. The operation condition control information DT is inputted to the image display processing apparatus 11 and supplied to the encryption processing section 26 in the image display processing apparatus 11. The encryption processing section 26 uses the public key PK stored in the internal memory 25 to encrypt the operation condition control information DT to produce encrypted operation condition control information DTe and stores the encrypted operation condition control information DTe into the encrypted operation condition control information storage section 24.

Figure 27:
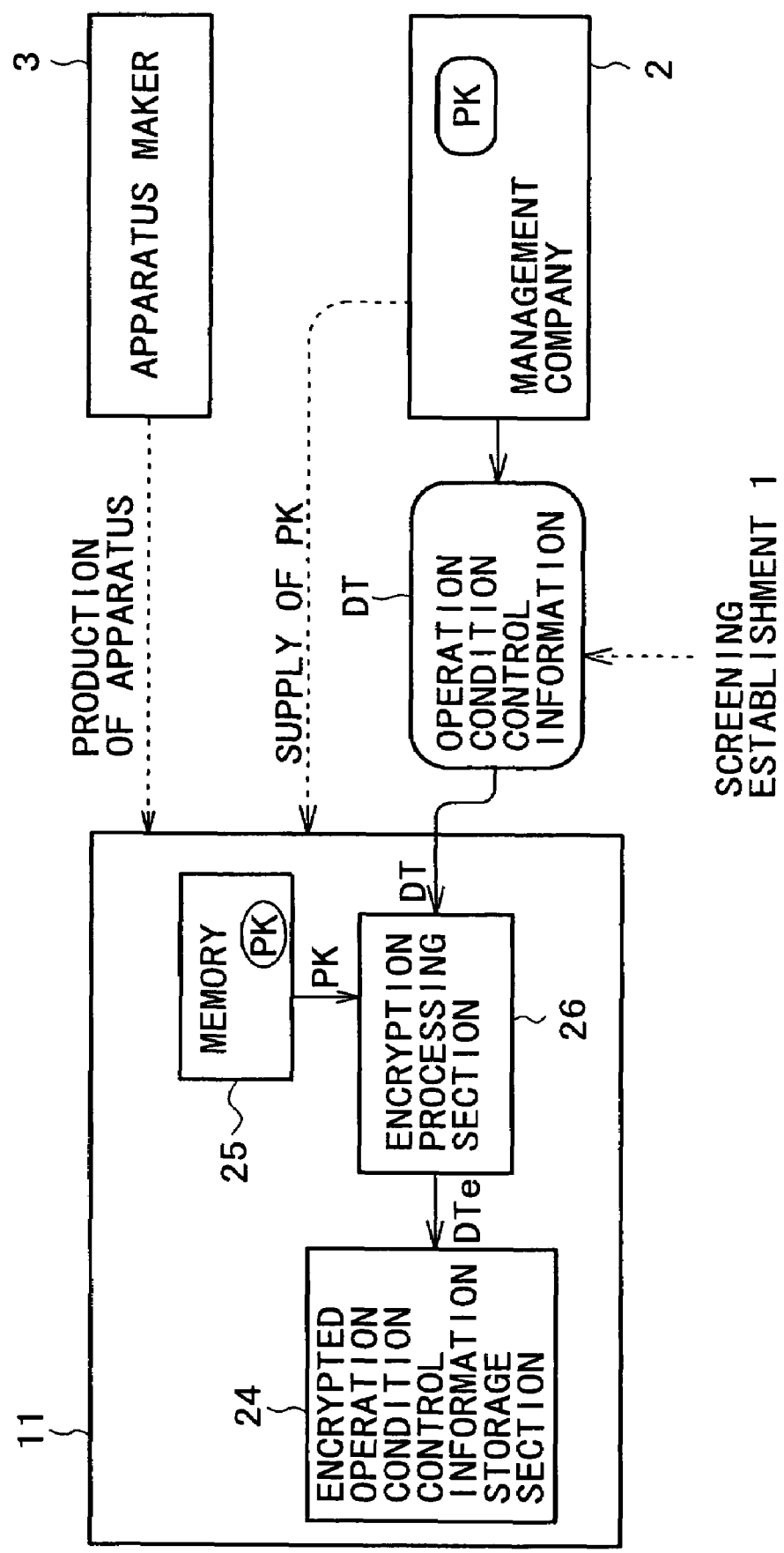
FIG. 27 is a diagrammatic view illustrating a further example of a mode of production of operation condition control information of the embodiment.

FIG. 27 illustrates an example wherein the management company 2 sends or transmits the public key PK to the screening establishment 1. The image display processing apparatus 11 produced by the apparatus maker 3 is supplied to the screening establishment 1.

The management company 2 stores the public key PK into a medium (flexible disk, CD, DVD, semiconductor memory, memory card, magnetic card or the like) and sends the medium to the screening establishment 1 or distributes the public key PK through a communication network such as a telephone network or the Internet.

The screening establishment 1 receiving the public key PK performs an operation of storing the public key PK into the image display processing apparatus 11.

The screening establishment 1 receives (or produces) operation condition control information DT upon screening of certain image contents. The operation condition control information DT is inputted to the image display processing apparatus 11 and supplied to the encryption processing section 26 in the image display processing apparatus 11. The encryption processing section 26 uses the public key PK stored in the internal memory 25 to encrypt the operation condition control information DT to produce encrypted operation condition control information DTe and stores the encrypted operation condition control information DTe into the encrypted operation condition control information storage section 24.

Figure 28:
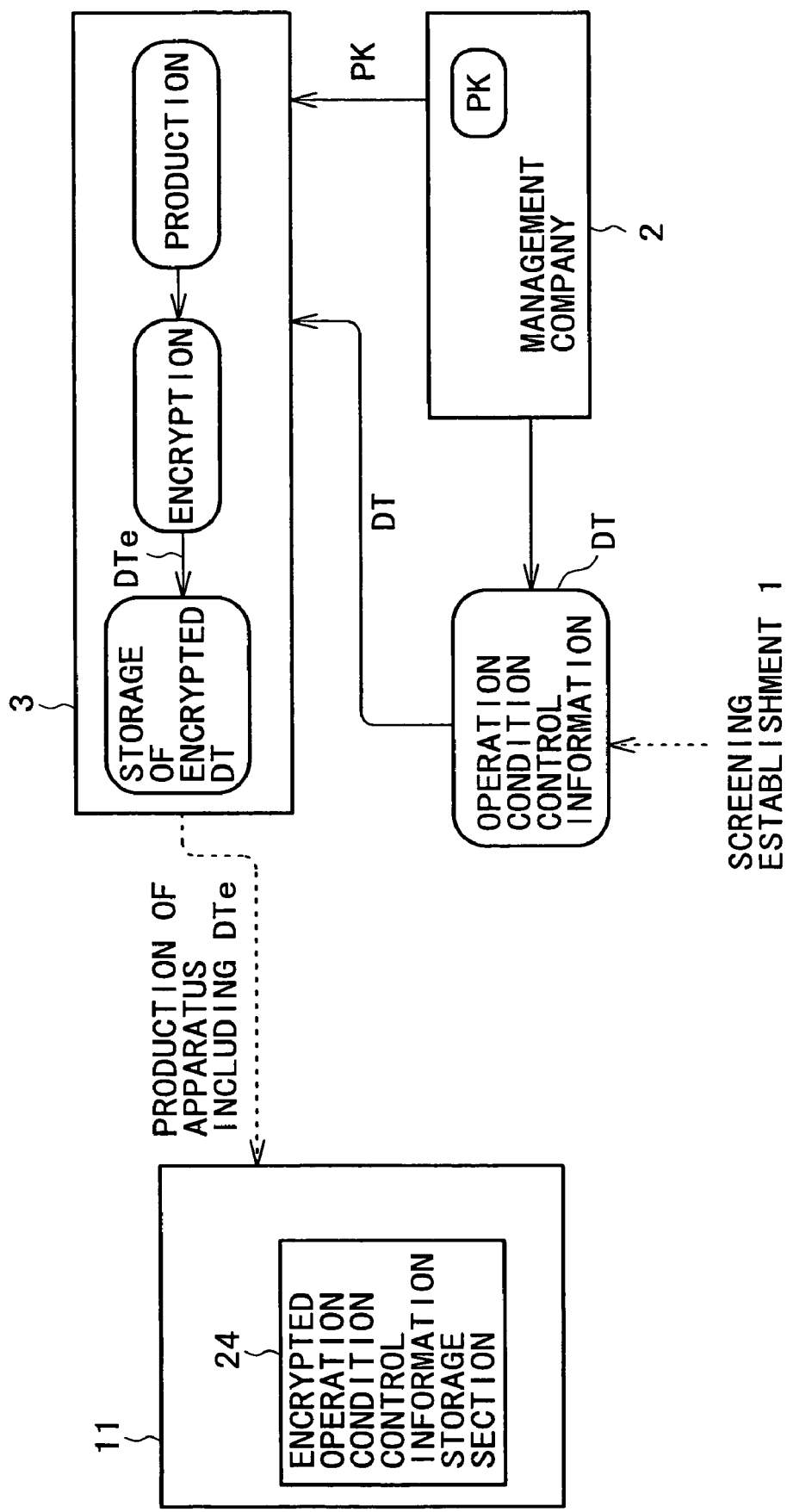
FIG. 28 is a diagrammatic view illustrating a still further example of a mode of production of operation condition control information of the embodiment.

FIG. 28 illustrates an example wherein the apparatus maker 3 performs encryption of operation condition control information DT.

The apparatus maker 3 receives, upon production of the image display processing apparatus 11, the public key PK from the management company 2. Further, the apparatus maker 3 receives operation condition control information DT.

Then, after the apparatus maker 3 produces the image display processing apparatus 11, it uses, at a stage prior to shipment, the public key PK to encrypt the operation condition control information DT to produce encrypted operation condition control information DTe and stores the encrypted operation condition control information DTe into the encrypted operation condition control information storage section 24 in the image display processing apparatus 11. Thereafter, the apparatus maker 3 supplies the image display processing apparatus 11 to the screening establishment 1.

Figure 29:
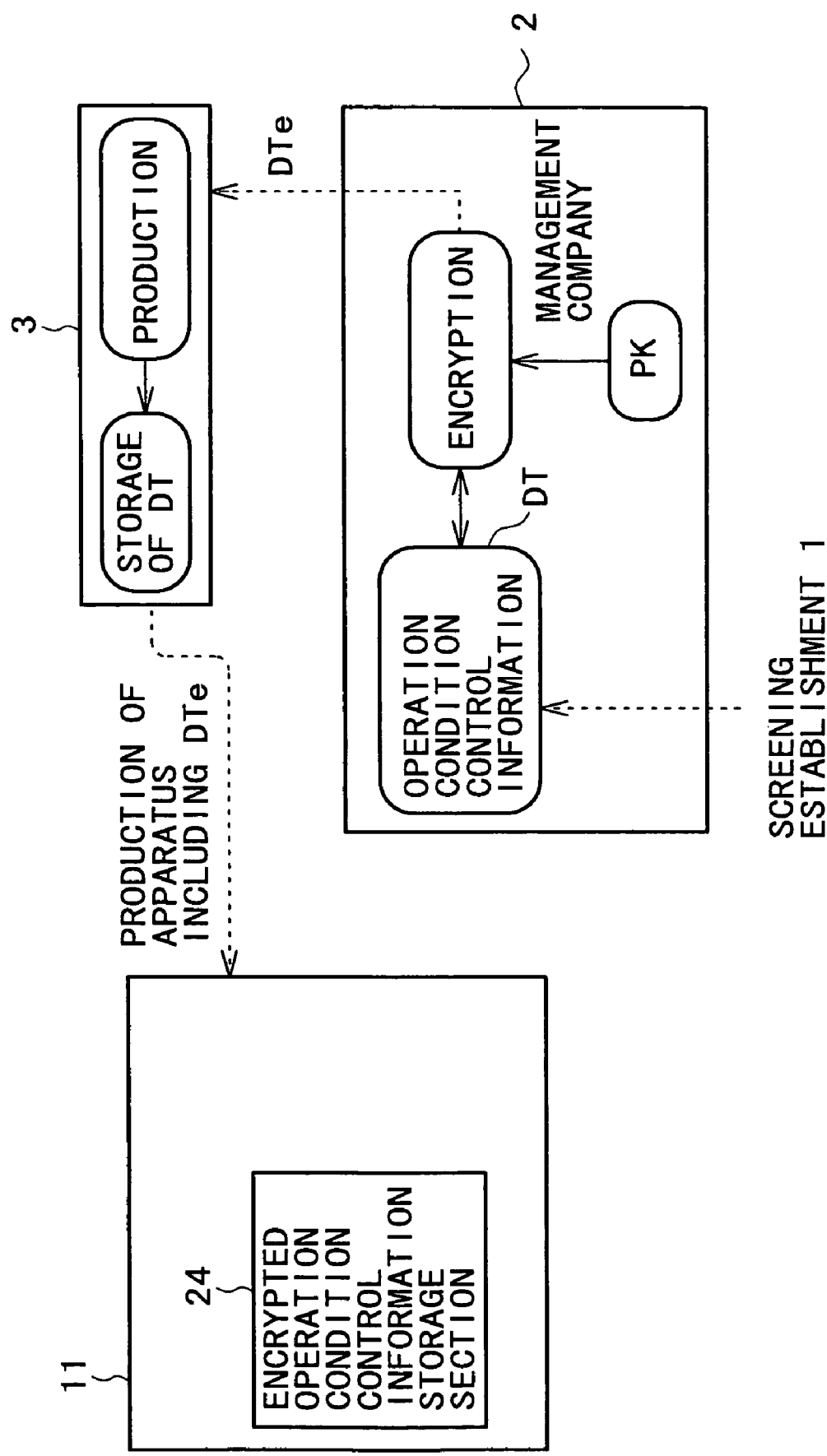
FIG. 29 is a diagrammatic view illustrating a yet further example of a mode of production of operation condition control information of the embodiment.

FIG. 29 illustrates an example wherein the management company 2 performs encryption of operation condition control information DT.

The management company 2 uses the public key PK to encrypt the operation condition control information DT to be issued to a certain screening establishment 1 and delivers resulting encrypted operation condition control information DTe to the apparatus maker 3.

The apparatus maker 3 stores, upon production of the image display processing apparatus 11, the encrypted operation condition control information DTe into the encrypted operation condition control information storage section 24 in the image display processing apparatus 11. Thereafter, the apparatus maker 3 supplies the image display processing apparatus 11 to the screening establishment 1.

Figure 30:
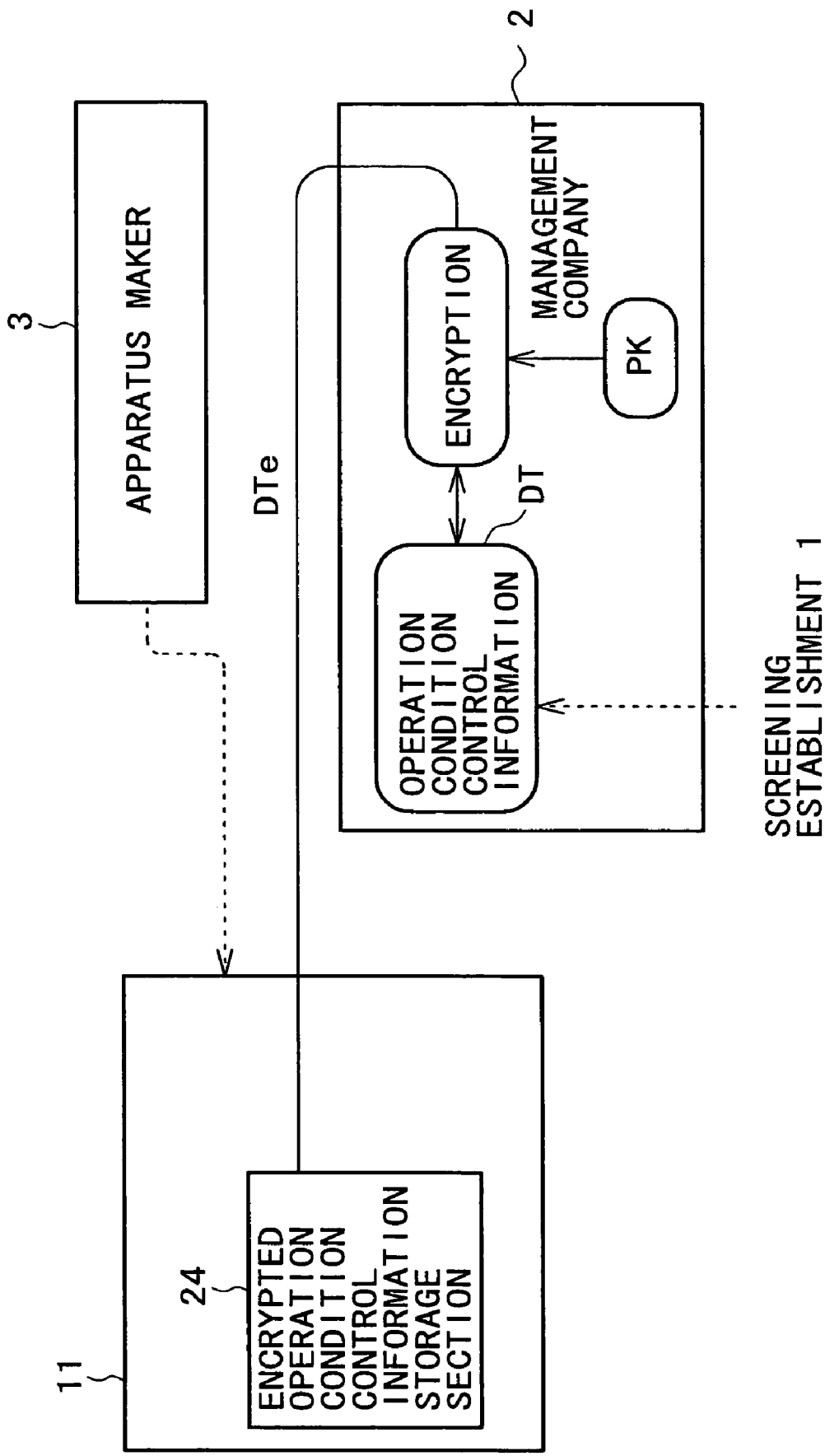
FIG. 30 is a diagrammatic view illustrating an additional example of a mode of production of operation condition control information of the embodiment.

FIG. 30 illustrates another example wherein the management company 2 performs encryption of operation condition control information DT.

The management company 2 uses the public key PK to encrypt operation condition control information DT to be issued to a certain screening establishment 1 to produce encrypted operation condition control information DTe.

The apparatus maker 3 produces the image display processing apparatus 11 and supplied it to the screening establishment 1.

The management company 2 stores the encrypted operation condition control information DTe into a medium (flexible disk, CD, DVD, semiconductor memory, memory card, magnetic card or the like) and sends the medium to the screening establishment 1 or distributes the encrypted operation condition control information DTe through a communication network such as a telephone network or the Internet.

The screening establishment 1 receiving the encrypted operation condition control information DTe performs an operation of storing the encrypted operation condition control information DTe into the image display processing apparatus 11.

For example, such procedures as described above can be used to place the image display processing apparatus 11 of the screening establishment 1 into a state wherein encrypted operation condition control information DTe is stored therein.

Naturally, various other storage procedures of encrypted operation condition control information DTe may be applicable.

6. Detection of Operation Condition Control Information

It is assumed that image re-pickup is performed by a member of bad faith in the audience or the stuff in the screening establishment 1 and a copy product 6 is distributed.

The management company 2 acquires the copy product 6 and analyzes the image to detect operation condition control information.

Figure 31A:
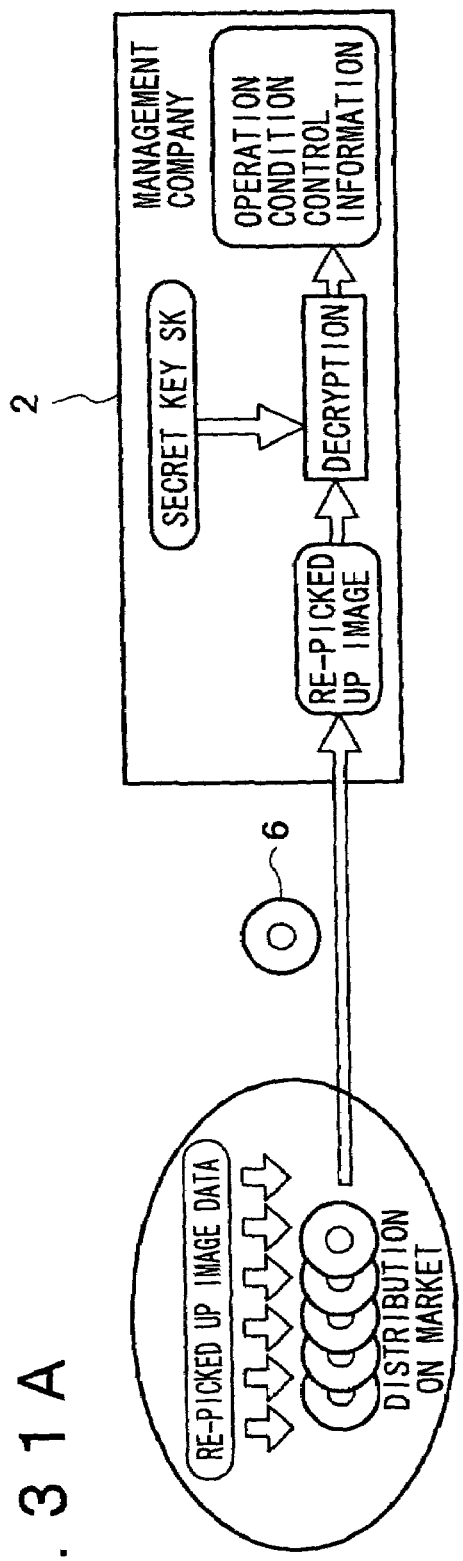
FIGS. 31A and 31B are diagrammatic views illustrating an analysis of operation condition control information by a management company of the embodiment.

FIG. 31A illustrates a manner wherein the management company 2 acquires the copy product 6 in some form and analyzes it.

The management company 2 would reproduce the re-picked up image from the copy product 6 and analyze the pattern of disorder on the image. For example, the management company 2 analyzes, for each period of N frames illustrated in FIG. 3, on which one of the display operation conditions A and B the disorder of an image is based, and encrypted operation condition control information DTe is extracted as a result of the analysis.

If the secret key SK is used to decrypt the encrypted operation condition control information DTe, then the original operation condition control information DT is obtained.

Figure 31B:
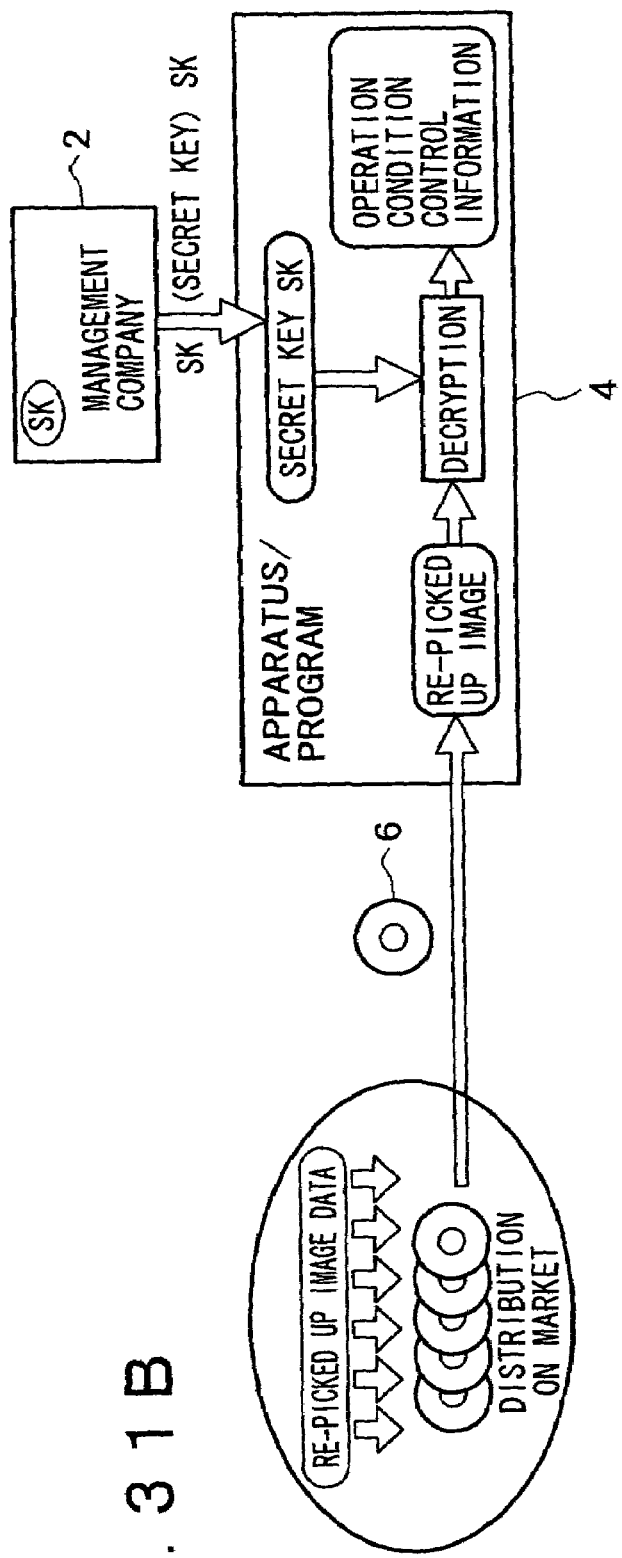

FIG. 31B illustrates an example wherein an apparatus or a program for detection detects operation condition control information.

For example, this is a case wherein a program (robot) circulating on a communication line such as the Internet is used to detect a copy product 6 which is distributed illegally as data on the Internet.

For the apparatus or program for detection, the management company 2 provides the secret key SK in advance.

The apparatus/program checks image data transmitted on a communication line such as the Internet to search for contents which exhibit some disorder in image originating from operation condition changeover of the present example. If such contents, that is, a copy product 6, is searched out, then the apparatus/program analyzes the pattern of the disorder in image to extract the encrypted operation condition control information DTe. If the secret key SK supplied from the management company 2 is used to decrypt the encrypted operation condition control information DTe, then the original operation condition control information DT is obtained.

7. Effects of the Embodiment and Modifications

According to such an embodiment as described above, the following effects are achieved.

First, in the screening establishment 1, image display is performed in such a state that a variation in display operation condition is not recognized by the audience (that is, no image degradation occurs visually). Meanwhile, if the displayed image is re-picked up, then degradation occurs with the re-picked up image.

Although it is possible to moderate the degradation of the re-picked up image by optimally adjusting the shutter speed or the like of the video camera 5, it is difficult to completely remove the degradation. Particularly where the situation that various changeover modes are present as in the examples of the operation condition changeover described hereinabove and a plurality of changeover modes are performed in combination is taken into consideration, it is substantially impossible to restore the re-picked up image from the degradation.

Accordingly, even if high performance apparatus are used, the copy product 6 is obliged to present a deteriorated image, and a person who observes the reproduced image of the copy product 6 would decrease its desire to purchase it.

Further, also the fact that the image degradation allows the copy product to be recognized provides a psychological effect to the person to stop the purchase.

In other words, since the product value of the copy product drops and the desire of general people to purchase decreases from the fact that the copy product is an illegal product, the desire for image re-pickup and for illegal copy drops and this gives rise to a direct effect on prevention of image re-pickup.

Further, when a re-picked up image picked up illegally is distributed, such various kinds of information including information of the place and the time at which the image was picked up, the apparatus used for the image-pickup, the substance of the image and the copyright as described above can be extracted as the operation condition control information from the re-picked up image.

The management company or the like can perform enhancement of the prevention of image re-pickup and specification of a criminal who conducted the illegal image pickup based on the information. For example, if a plurality of different re-picked up images were picked up in the same establishment, then the criminal can be narrowed down to those people who entered the establishment on the date and hour when the image was picked up. Consequently, specification of the person who picked up the image can be achieved to some degree.

Further, based on the operation condition control information extracted from an illegal copy product, a person or an organization who has the copyright can take a countermeasure such as to give a warning or issue a request for compensation money to a trader interested in image re-pickup, or issue a request for cooperation in severe prevention of image re-pickup to the screening establishment 1 or the like. Meanwhile, also such a psychological effect can be expected that also the other screening establishments make a further effort to prevent image re-pickup fearing the penalty (degradation of the reputation or the like) in a case wherein an image is re-picked up in the establishment. For example, education of the stuff or superintendence against image re-pickup can be expected as a countermeasure of the screening establishment 1 side.

Those described above are exhibited as indirect effects of prevention of image re-pickup.

Further, the operation condition control information is not embedded in image data itself like an electronic watermark. In other words, the operation condition control information does not alter the image itself and does not involve picture quality degradation of the image. Therefore, the operation condition control information is comparatively readily acceptable to the author or the image producing person.

Further, where the operation condition control information is encrypted operation condition control information which includes encrypted predetermined substance, also the security of the operation condition control information itself is maintained.

Furthermore, where the encrypted operation condition control information is used for changeover of the display operation condition, since the changeover timing of the display operation condition does not leak to the outside (for example, to a person who tries to re-pick up an image or the like), also the function of degrading a re-picked up image is further strengthened.

For example, in such a case that the stuff in the screening establishment 1 cooperates with a trader interested in image re-pickup and the substance of the operation condition control information becomes known to the trader, such a situation that the display condition changeover timing is known to the trader and the degradation of a re-picked up image is removed may possibly occur. However, if the display operation condition is changed over based on the encrypted operation condition control information, then the display condition changeover timing cannot become known to the trader, and it becomes almost impossible to allow the recovery of the re-picked up image from the degradation.

It is to be noted that the present invention can be carried out not like the embodiment described above, but various modifications are possible. In the following, several modifications are described.

Although various examples of the display operation condition changeover are described with reference to FIGS. 6A, 6B and through FIG. 24, further various examples of the display operation condition changeover and combinations of them are possible.

Further, the corresponding relationships between the values "0" and "1" of the operation condition control information and the operation conditions may be reversed to those described hereinabove.

Furthermore, while the changeover modes described hereinabove are performed in accordance with the two values of "0" and "1", they may be changed over otherwise in accordance with three or more values. In particular, three or more scanning conditions which are different in terms of the frame rate, luminance, scanning direction or the like are set, and they are changed over depending upon the three values of "0", "1" and "2".

Or, where the scanning condition is changed over among four scanning conditions as in the case of FIG. 21 or the like, they may correspond to the four values of "0", "1", "2" and "3".

Further, while, in the case of FIG. 21 or the like, a plurality of scanning conditions correspond to one value, they may not be changed over in order, but a scanning condition corresponding to a value may be selected at random from among a plurality of scanning conditions.

Further, display operation condition changeover based on the operation condition control information may be performed through the entire image contents, for example, of a cinema, or display operation condition changeover may otherwise be performed partially within image contents. For example, it is a possible idea to perform changeover for several minutes from the beginning and alternately repeat normal display which does not involve changeover and display which involves changeover for every predetermined period of time.

Or else, it is a possible idea to perform changeover based on operation condition control information for a fixed period of time and perform changeover at random without based on operation condition control information for another fixed period of time.

As the number of operation patterns of the changeover methods, complication of the periods for execution and complication such as insertion of a non-changeover and/or random changeover period increase, the difficulty in recovery of the re-picked up image against deterioration can be promoted.

Although it is described that the operation condition control information is stored as encrypted operation condition control information DTe, alternatively the operation condition control information DT before encryption may be stored into the image display processing apparatus 11 and then encrypted upon screening.

Alternatively, the operation condition control information may be used as it is without encrypting the same to perform display operation condition changeover.

The encryption method for the operation condition control information is not limited to the public key encryption method, but various encryption methods can be applied.

Further, the encrypted operation condition control information DTe or the operation condition control information may be further encoded into changeover control data such that the display operation condition changeover is performed in response to the encoded data. As one of such encoding methods, also it is included that the probabilities of appearance of "1" and "0" in the variable length changeover described hereinabove are set equal to each other.

It is to be noted that the process for preventing recognition of a visual variation by the audience described hereinabove in connection with the frame rate changeover or luminance changeover is effective not only for a changeover mode which is based on operation condition control information but also for another changeover mode wherein the operation condition is changed over, for example, at random without being based on operation condition control information.

INDUSTRIAL APPLICABILITY

As can be understood from the foregoing description, according to the present invention, a literary work such as a cinema or a video image is prevented from being picked up by an image pickup apparatus such as a video camera and distributed illegally to effectively achieve prevention of image re-pickup and distribution and protection of the copyright. Such preventions mentioned above are achieved by making use of a direct suppression effect that a re-picked up image is deteriorated without altering an original image and an indirect suppression effect that operation condition control information extracted from a variation in pattern of the image deterioration is utilized to perform protection against image re-pickup.

More particularly, where one or a plurality of changeover modes from among changeover of the frame rate, changeover of the scanning direction, changeover of the luminance, changeover of the scanning phase, changeover of the scanning pattern, changeover of the time position of scanning, and changeover of the scanning interval are performed as changeover of the display operation condition, a stripe pattern or the like can be produced on the re-picked up image and the image quality can be degraded. Consequently, direction suppression of image re-pickup can be anticipated.

Further, such changeover of the display operation condition as described above does not give rise to image degradation to the audience if such a technique as to select such two or more operation conditions between which a variation cannot be recognized or control of the brightness is performed in parallel.

Further, where changeover of the display operation condition is executed based on the value of the operation condition control information, even if the operation condition control information is not embedded in an original image signal itself, the operation condition control information can be added to the re-picked up image. In other words, since information is not embedded in an original image signal itself as in the case of an electronic watermark, picture quality degradation of the image is not invited. Therefore, the operation condition control information is comparatively readily acceptable to the author or the image producing person.

Further, where the operation condition control information includes information regarding an image itself such as a serial number unique to the image, information regarding an image display apparatus such as an apparatus ID or a serial number, information regarding an image display establishment such as a movie theater, a screening place or the name of a person in charge, information regarding the image display date and hour such as the date and hour or the term of screening or information regarding image management such as a management company, various effective countermeasures for prevention of image re-pickup can be taken based on a result of an analysis of the re-picked up image, that is, based on a result of extraction of the operation condition control information.

Further, where the operation condition control information is encrypted operation condition control information which includes encrypted predetermined substance, also the security of the operation condition control information itself is maintained. Furthermore, where the encrypted operation condition control information is used for changeover of the display operation condition, since the changeover pattern of the display operation condition does not leak to the outside (for example, to a person who tries to re-pick up an image or the like), also the function of degrading a re-picked up image is further strengthened.

The invention claimed is:

1. An image display method, characterized in that
an image signal is inputted, and
when the inputted image signal is to be displayed or outputted, changeover of a display operation condition is performed based on a value of encrypted operation condition control information having a predetermined attribute in order to display or output the image signal that was inputted,
whereby the predetermined attribute is varied according to the place and/or time of display or output of the image signal, and
whereby a management source analyzes a pattern of disorder in an illegal copy of the image signal as displayed to determine a predetermined attribute associated with the illegal copy and cross-references the predetermined attribute with its corresponding place and/or time to determine the place and/or time of creation of the illegal copy,
whereby no image is superimposed on the displayed image signal and the pattern of disorder results solely from the manner in which the image signal is reproduced as a result of the changeover of a display operation condition which is based on a value of the encrypted operation condition control information.

2. The image display method according to claim 1, characterized in that, when frame images are to be produced from the inputted image signal and successively outputted or displayed, a number of frames of the frame images within a predetermined unit time period is changed over, based on the operation condition control information having the predetermined attribute.

3. The image display method according to claim 1, characterized in that, when frame images are to be produced from the inputted image signal and successively outputted or displayed, an interval across which the frame images are outputted is changed over based on the operation condition control information having the predetermined attribute.

4. The image display method according to claim 1, characterized in that the changeover of the operation condition control information is performed such that a variation of a displayed image caused by the changeover cannot be recognized visually, but when the displayed image is picked up by an image apparatus to produce a resulting image signal, deterioration is provided on an image based on the resulting image signal.

5. The image display method according to claim 1, characterized in that the operation condition control information includes one of information regarding an image itself, information regarding an image display apparatus, information regarding an image display establishment, information regarding a date and hour of image display, and information regarding image management.

6. The image display method according to claim 1, characterized in that the operation condition control information has the predetermined attribute in an encrypted form.

7. An image display processing apparatus, comprising:
signal processing means for performing a signal process for displaying or outputting a processed image signal from an image signal inputted thereto;
a display section for displaying the processed image signal; and
a control section for performing, when the image signal is to be displayed on or outputted from said display section, changeover of a display operation condition based on a value of encrypted operation condition control information having a predetermined attribute and controlling said display section to display or output the image signal,
whereby the predetermined attribute is varied according to the place and/or time of display or output of the image signal, and
whereby a management source analyzes a pattern of disorder in an illegal copy of the image signal as displayed to determine a predetermined attribute associated with the illegal copy and cross-references the predetermined attribute with its corresponding place and/or time to determine the place and/or time of creation of the illegal copy,
whereby no image is superimposed on the displayed image signal and the pattern of disorder results solely from the manner in which the image signal is reproduced as a result of the changeover of a display operation condition which is based on a value of the encrypted operation condition control information.

8. The image display processing apparatus according to claim 7, characterized in that, when frame images are to be produced from the inputted image signal and successively outputted or displayed, said control section changes over a number of frames of the frame images when a predetermined unit time period based on the operation condition control information having the predetermined attribute.

9. The image display processing apparatus according to claim 7, characterized in that, when frame images are to be produced from the inputted image signal and successively outputted or displayed, said control section changes over an interval across which the frame images are outputted based on the operation condition control information having the predetermined attribute.

* * * * *